(12) United States Patent
Livingston et al.

(10) Patent No.: US 7,877,934 B2
(45) Date of Patent: Feb. 1, 2011

(54) LIFTING SYSTEM AND APPARATUS FOR CONSTRUCTING WIND TURBINE TOWERS

(75) Inventors: Tracy Livingston, Heber City, UT (US); Terry Schrader, Southlake, TX (US); James Goldhardt, Salt Lake City, UT (US); James Lott, Newburgh, IN (US)

(73) Assignee: Wind Tower Systems, LLC, Park City, UT (US)

( * ) Notice: Subject to any disclaimer, the term of this patent is extended or adjusted under 35 U.S.C. 154(b) by 952 days.

(21) Appl. No.: 11/649,033

(22) Filed: Jan. 3, 2007

(65) Prior Publication Data
US 2007/0151194 A1 Jul. 5, 2007

Related U.S. Application Data

(60) Provisional application No. 60/755,615, filed on Dec. 30, 2005, provisional application No. 60/848,725, filed on Oct. 2, 2006.

(51) Int. Cl.
*B66C 23/62* (2006.01)
(52) U.S. Cl. .................... 52/40; 52/745.17; 52/296; 52/848
(58) Field of Classification Search ............ 52/40, 52/169.3, 745.13, 745.17, 296, 848, 115, 52/116, 120; 254/4 R; 29/281.1
See application file for complete search history.

(56) References Cited

U.S. PATENT DOCUMENTS

| 877,587 A | 1/1908 | Noyes |
| 889,395 A | 6/1908 | Noyes |
| RE12,842 E | 8/1908 | Noyes |
| 1,506,984 A | 9/1924 | Marshall |

(Continued)

FOREIGN PATENT DOCUMENTS

DE 194961 2/1908

(Continued)

OTHER PUBLICATIONS

Argyriadis et al., Determination of Fatigue Loading on a Wind Turbine with Oil Damping Device, Germanischer Lloyd WindEnergie GmbH, 2004, Hamburg, Germany.

*Primary Examiner*—Richard E Chilcot, Jr.
*Assistant Examiner*—Beth Stephan
(74) *Attorney, Agent, or Firm*—Clayton, Howarth & Cannon, P.C.

(57) ABSTRACT

The disclosed invention is utilized for mounting a wind turbine and blade assembly on the upper end of a wind turbine tower. The invention generally includes a frame or truss that is pivotally secured to the top bay assembly of the tower. A transverse beam is connected to the frame or truss and extends fore of the tower when the frame or truss is in a first position and generally above the tower when in a second position. When in the first position, a wind turbine or blade assembly can be hoisted to the top of the tower. The wind turbine or blade assembly is then moved into position for mounting to the tower as the frame or truss is pivoted to a second position. When the turbine and blade assembly are secured to the tower, the frame or truss is disconnected from the tower and lowered to the ground.

10 Claims, 18 Drawing Sheets

U.S. PATENT DOCUMENTS

| | | |
|---|---|---|
| 2,014,784 A | 9/1935 | Schuler |
| 2,135,631 A * | 11/1938 | Amesbury .................. 212/176 |
| 2,145,232 A | 1/1939 | Bauer |
| 2,246,151 A | 6/1941 | Vrooman |
| 2,756,952 A | 7/1956 | Gazley |
| 2,945,231 A | 7/1960 | Scheldorf |
| 2,950,576 A | 8/1960 | Rubenstein |
| 3,079,277 A | 2/1963 | Painter |
| 3,100,555 A | 8/1963 | Ashton |
| 3,119,471 A | 1/1964 | Turner |
| 3,219,214 A | 11/1965 | Baer |
| 3,276,762 A | 10/1966 | Thomas |
| 3,277,614 A | 10/1966 | Marie |
| 3,371,458 A | 3/1968 | Sturgill |
| 3,456,972 A | 7/1969 | Drotar |
| 3,485,005 A | 12/1969 | Kutchai |
| 3,561,711 A | 2/1971 | Dodge |
| 3,574,982 A | 4/1971 | Wakonig |
| 3,618,928 A | 11/1971 | Taylor |
| 3,634,989 A | 1/1972 | Rogers |
| 3,650,078 A | 3/1972 | Jennings |
| 3,650,081 A | 3/1972 | McCracken |
| 3,659,490 A | 5/1972 | Buck |
| 3,710,674 A | 1/1973 | Tabor |
| 3,742,662 A | 7/1973 | Ballou |
| 3,747,695 A | 7/1973 | Branham |
| 3,763,617 A | 10/1973 | Nell |
| 3,812,771 A | 5/1974 | Yokoyama et al. |
| 3,892,398 A | 7/1975 | Marsh |
| 3,939,988 A * | 2/1976 | Wellman .................... 212/297 |
| 4,039,050 A | 8/1977 | Bowling et al. |
| 4,226,554 A | 10/1980 | Vandiver et al. |
| 4,254,847 A | 3/1981 | Kamman et al. |
| 4,261,441 A | 4/1981 | Wood |
| 4,272,929 A | 6/1981 | Hanson |
| 4,278,726 A | 7/1981 | Wieme |
| 4,297,076 A | 10/1981 | Donham et al. |
| 4,311,434 A | 1/1982 | Abe |
| 4,312,162 A | 1/1982 | Medney |
| 4,320,602 A | 3/1982 | Richardson |
| 4,403,916 A | 9/1983 | Skelskey |
| 4,406,558 A | 9/1983 | Kochendorfer et al. |
| 4,411,114 A | 10/1983 | Wurtinger et al. |
| 4,420,692 A | 12/1983 | Kos et al. |
| 4,435,647 A | 3/1984 | Harner et al. |
| 4,457,500 A | 7/1984 | Drachenberg et al. |
| 4,515,525 A | 5/1985 | Doman |
| 4,565,929 A | 1/1986 | Baskin et al. |
| 4,674,954 A | 6/1987 | Kenfield |
| 4,694,630 A | 9/1987 | McGinnis |
| 4,743,141 A | 5/1988 | Simensen et al. |
| 4,783,937 A | 11/1988 | Sato |
| 4,807,840 A | 2/1989 | Baker et al. |
| 4,856,662 A * | 8/1989 | Marvin et al. ............... 212/176 |
| 4,921,224 A | 5/1990 | Fukumura et al. |
| 4,987,711 A | 1/1991 | Noji et al. |
| 5,070,663 A | 12/1991 | Sakai et al. |
| 5,203,435 A | 4/1993 | Dolgin |
| 5,213,470 A | 5/1993 | Lundquist |
| 5,219,051 A | 6/1993 | Davis |
| 5,239,789 A | 8/1993 | Uno et al. |
| 5,327,700 A | 7/1994 | Sorenson et al. |
| 5,347,771 A | 9/1994 | Kobori et al. |
| 5,775,049 A | 7/1998 | Fricke |
| 5,820,348 A | 10/1998 | Fricke |
| 5,832,688 A | 11/1998 | Crissey et al. |
| 5,905,771 A | 5/1999 | Erbes et al. |
| 5,946,866 A | 9/1999 | Weglewski et al. |
| 5,956,915 A | 9/1999 | Piper et al. |
| 6,048,426 A | 4/2000 | Pratt |
| 6,287,664 B1 | 9/2001 | Pratt |
| 6,354,576 B1 | 3/2002 | Jacobs et al. |
| 6,397,528 B1 | 6/2002 | Rahimian |
| 6,408,587 B2 | 6/2002 | Cronin et al. |
| 6,438,905 B2 | 8/2002 | Constantinou |
| 6,453,962 B1 | 9/2002 | Pratt |
| 6,463,709 B2 | 10/2002 | Meguro et al. |
| 6,467,521 B1 | 10/2002 | Pratt |
| 6,522,025 B2 | 2/2003 | Willis et al. |
| 6,578,339 B1 | 6/2003 | McGinnis |
| 6,614,125 B2 | 9/2003 | Willis et al. |
| 6,626,642 B1 | 9/2003 | Veldkamp |
| 6,672,837 B1 | 1/2004 | Veldkamp et al. |
| 6,695,588 B1 | 2/2004 | Nielsen |
| 6,701,680 B2 | 3/2004 | Fanucci et al. |
| 6,745,539 B1 | 6/2004 | Heim |
| 6,782,667 B2 | 8/2004 | Henderson |
| 6,784,566 B2 | 8/2004 | Thomas |
| 6,789,309 B2 | 9/2004 | Kondo |
| 6,837,010 B2 | 1/2005 | Powell et al. |
| 6,840,016 B1 | 1/2005 | Mualla |
| 7,015,872 B1 | 3/2006 | Little |
| 7,040,583 B1 | 5/2006 | Holland et al. |
| 7,062,883 B1 | 6/2006 | Langholz et al. |
| 7,075,189 B2 | 7/2006 | Heronemus et al. |
| 7,220,104 B2 | 5/2007 | Zheng et al. |
| 2002/0084142 A1 | 7/2002 | Brennan et al. |
| 2003/0071468 A1 | 4/2003 | Platt |
| 2003/0183594 A1* | 10/2003 | Torres Martinez .......... 212/196 |
| 2005/0186076 A1 | 8/2005 | Hessel |
| 2006/0090571 A1 | 5/2006 | Krampitz et al. |
| 2006/0120809 A1 | 6/2006 | Ingram et al. |
| 2006/0147306 A1 | 7/2006 | Zheng et al. |
| 2006/0213145 A1 | 9/2006 | Haller |
| 2007/0243063 A1 | 10/2007 | Schellstede |

FOREIGN PATENT DOCUMENTS

| | | |
|---|---|---|
| DE | 94 14 643.8 | 1/1995 |
| DE | 196 47 515 | 11/1996 |
| DE | 197 41 988 | 9/1997 |
| EP | 1 284 365 | 7/2002 |
| EP | 1 677 006 | 12/2005 |
| FR | 2 500 555 | 8/1982 |
| GB | 1008782 | 11/1965 |
| JP | 3-539 134078 | 1/1991 |
| JP | 10-205430 | 8/1998 |
| SU | 1421959 | 9/1988 |
| WO | 96/10130 | 4/1996 |
| WO | 97/21621 | 6/1997 |
| WO | 00/77394 | 12/2000 |
| WO | 2006/062390 | 6/2006 |

* cited by examiner

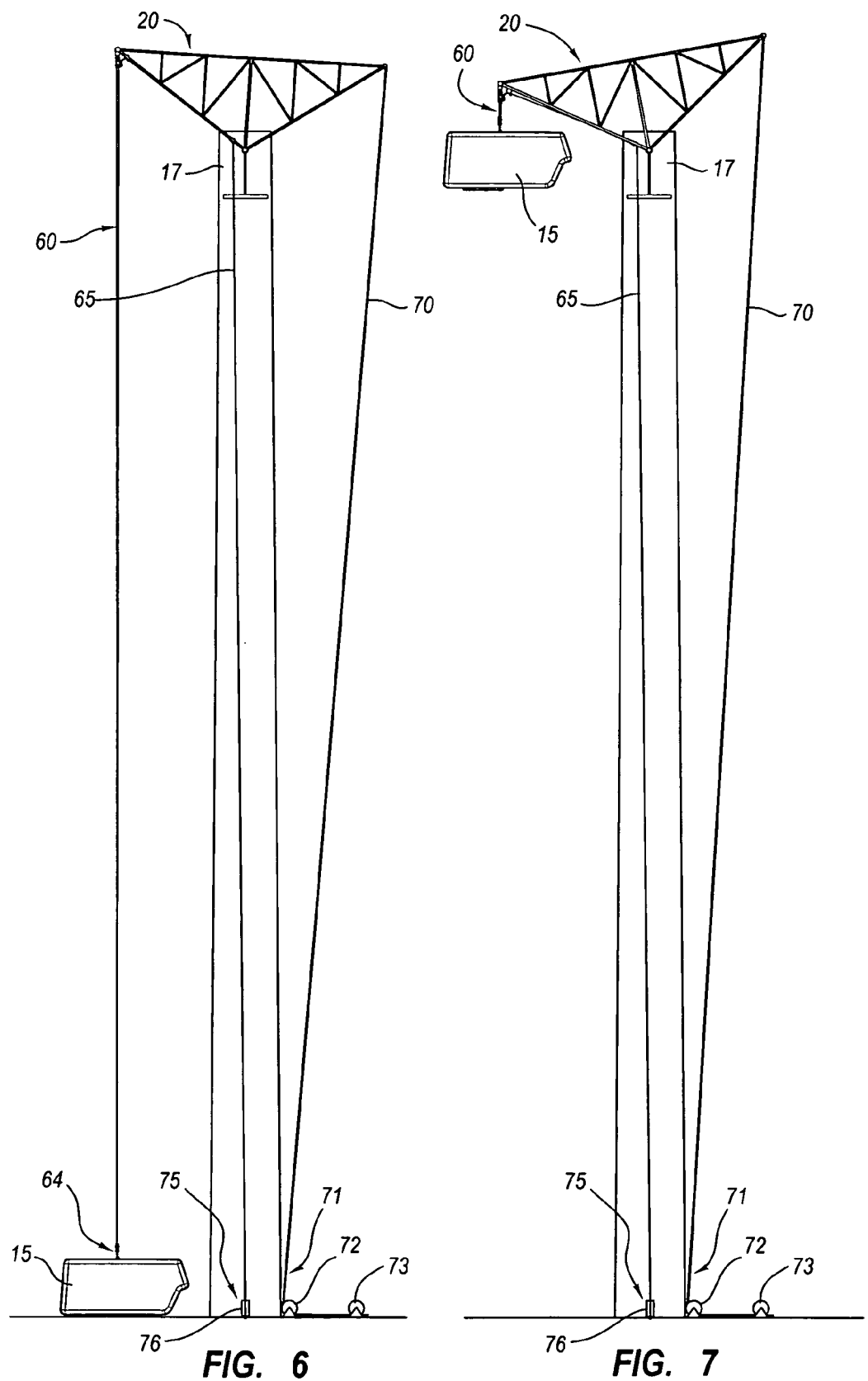

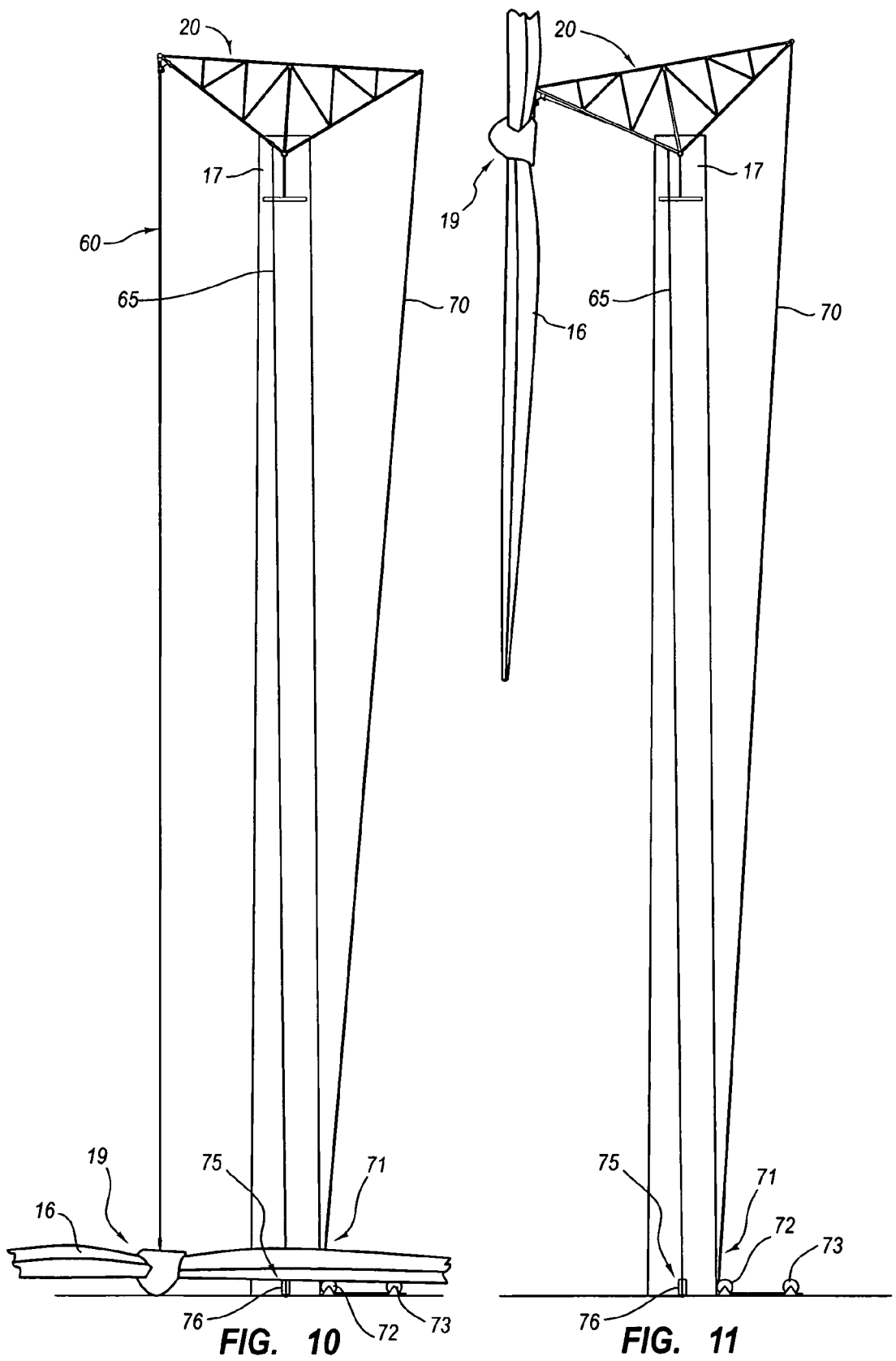

US 7,877,934 B2

LIFTING SYSTEM AND APPARATUS FOR CONSTRUCTING WIND TURBINE TOWERS

RELATED APPLICATIONS

This present application claims priority to U.S. Provisional Patent Application No. 60/755,615, entitled "Turbine and Blade Lifting Apparatus and Method," filed Dec. 30, 2005 and U.S. Provisional Patent Application No. 60/848,725, entitled "Lifting System for Wind Turbine and Structural Tower," filed Oct. 2, 2006.

STATEMENT REGARDING STATE OF CALIFORNIA SPONSORED RESEARCH OR DEVELOPMENT

The invention was made with State of California support under California Energy Commission grant number PIR-04-012. The Energy Commission has certain rights to this invention.

TECHNICAL FIELD OF THE INVENTION

The present invention relates to wind turbines and structural towers and, more particularly, to equipment and methods used in assembling high elevation structural towers for wind turbines and for mounting wind turbines and blades upon high elevation structural towers.

BACKGROUND OF THE INVENTION

Wind turbines are an increasingly popular source of energy in the United States and Europe and in many other countries around the globe. In order to realize scale efficiencies in capturing energy from the wind, developers are erecting wind turbine farms having increasing numbers of wind turbines with larger turbines positioned at greater heights. In large wind turbine farm projects, for example, developers typically utilize twenty-five or more wind turbines having turbines on the order of 1.2 MW positioned at fifty meters or higher. These numbers provide scale efficiencies that reduce the cost of energy while making the project profitable to the developer. Placing larger turbines at greater heights enables each turbine to operate substantially free of boundary layer effects created through wind shear and interaction with near-ground irregularities in surface contours—e.g., rocks and trees. Greater turbine heights also lead to more steady operating conditions at higher sustained wind velocities, thereby producing, on average, more energy per unit time. Accordingly, there are economic and engineering incentives to positioning larger turbines at greater heights.

Positioning larger turbines at greater heights comes, however, with a cost. The cost is associated with the larger and more massive towers that are required to withstand the additional weight of the larger turbines and withstand the wind loads generated by placing structures at the greater heights where wind velocities are also greater and more sustained. An additional cost concerns the equipment that is required to erect the wind turbine. For example, the weight of conventional tube towers for wind turbines—e.g., towers having sectioned tube-like configurations constructed using steel or concrete—increases in proportion to the tower height raised to the $\frac{5}{3}$ power. Thus, a 1.5 MW tower typically weighing 176,000 lbs at a standard 65 meter height will weigh approximately 275,000 lbs at an 85 meter height, an increase of about 56 percent. Towers in excess of 250,000 lbs, or higher than 100 meters, however, generally require specialized and expensive cranes to assemble the tower sections and to mount the turbine and blades on the assembled tower. Just the cost to transport and assemble one of these cranes can exceed $250,000 for a typical 1.5 MW turbine. In order to amortize the expense associated with such large cranes, wind turbine farm developers desire to pack as many wind turbines as possible onto the project footprint, thereby spreading the crane costs over many wind turbines. However, with sites having limited footprints, developers are forced to amortize transport and assembly costs of the crane using fewer turbines, which may be economically unfeasible. Further, projects installed on rough ground require cranes to be repeatedly assembled and disassembled, which may also be economically unfeasible. Projects located on mountain top ridges or other logistically difficult sites may, likewise, be all but eliminated due to unfeasible economics, in addition to engineering difficulties associated with locating a crane at such sites.

It is thus advantageous to be able to assemble high-elevation structural towers and to mount heavy wind turbines on the top of such towers without relying on relatively large and prohibitively expensive crane equipment. A principle object of the present invention is therefore to provide an apparatus and method for assembling high elevation structural towers and mounting wind turbines on top of such assembled towers without the need for large and prohibitively expensive crane equipment. This and other objects, features and advantages of the present invention will become more apparent with reference to the below description.

SUMMARY OF THE INVENTION

An apparatus and method for lifting a wind turbine assembly to the top of a high-elevation structural tower is disclosed. One embodiment of the apparatus comprises a pivot shaft positioned and connected proximate an upper end of a structural tower. A first lifting truss is pivotally connected to the shaft, the first lifting truss having a first distal end extending away from the shaft and a second distal end extending in a direction away from the first distal end. A second lifting truss is pivotally connected to the shaft, the second lifting truss having a first distal end extending away from the shaft and a second distal end extending in a direction away from the first distal end. A first transverse beam connects the first distal ends of the first and second lifting trusses, and a rigging assembly is connected to the transverse beam and configured for hoisting a turbine to the upper end of the tower. A pivot control cable connected to the first lifting truss proximate the second distal end for controlling pivot movement of the first and second lifting trusses about the pivot shaft. In further embodiments, the first lifting truss is triangular in shape and includes first and second members pivotally connected to the pivot shaft. The first member is positioned at an angle with respect to the second member with a portion of the pivot shaft being proximate the vertex of the angle, and with the angle being from about 95 degrees to about 180 degrees. In yet a further embodiment, the first lifting truss includes third and fourth members pivotally connected to the pivot shaft. In still further embodiments, the rigging assembly may comprise a block and tackle assembly; the first lifting truss may be pivotally connected to the pivot shaft using a bearing; and a second transverse beam may be disposed between and connected to the second distal ends with the pivot control cable being connected to the second transverse shaft.

In yet a further embodiment, an apparatus for lifting a wind turbine assembly to the top of a high-elevation structural tower comprises a support frame connected to the tower and a first lifting truss pivotally connected to the support frame, with the first lifting truss having a distal end extending away from the support frame. A rigging assembly is connected proximate the distal end and configured for hoisting a turbine to the upper end of the tower, while an hydraulic ram having a first end connected to the support frame and a second end connected to the first lifting truss controls pivoting movement of the lifting truss. A second lifting truss may also be pivotally connected to the support frame, with the second lifting truss having a distal end extending away from the support frame. A transverse beam may extend between the distal ends of the first and second lifting trusses and have the rigging assembly connected to the beam. A second hydraulic ram may have a first end connected to the support frame and a second end connected to the second lifting truss. The lifting trusses may be triangular in shape, may be a straight single piece member, or take on a variety of other shapes, including square, semicircular or circular.

Also disclosed is a method for erecting a high-elevation multiple-bay structural tower and associated wind turbine equipment on a foundation, the method comprising the steps of securing a base bay assembly to the foundation; positioning an intermediate bay assembly on top of the base bay assembly using a crane or ginpole; positioning a top bay assembly on top of the first intermediate bay assembly using a crane or ginpole; positioning one of the apparatus disclosed herein for lifting a wind turbine proximate the top bay assembly using a crane or ginpole; and hoisting and positioning a wind turbine and blades on top of the top bay assembly using one of the apparatus disclosed herein for lifting a wind turbine.

Features from any of the above mentioned embodiments may be used in combination with one another in accordance with the present invention. In addition, other features and advantages of the present invention will become apparent to those of ordinary skill in the art through consideration of the ensuing description, the accompanying drawings, and the appended claims.

BRIEF DESCRIPTION OF THE DRAWINGS

FIG. 6 illustrates the embodiment of the present invention depicted in FIG. 3 arranged for hoisting a turbine to the top of a tower;

FIG. 7 illustrates the embodiment of the present invention depicted in FIG. 3 after hoisting a turbine to the top of a tower;

FIG. 10 illustrates the embodiment of the present invention depicted in FIG. 3 arranged for hoisting a blade assembly to the top of a tower;

FIG. 11 illustrates the embodiment of the present invention depicted in FIG. 3 after hoisting a blade assembly to the top of a tower;

DETAILED DESCRIPTION OF THE INVENTION

Generally, the present invention relates to apparatus and methods used to assemble or construct high elevation structural towers supporting heavy loads, as in structural towers supporting wind turbines. In further detail, the present invention relates to an apparatus and method for lifting and positioning a wind turbine and associated blades on the top of a previously constructed and assembled structural tower. In yet further detail, the present invention relates to a system and method for assembling and constructing a high elevation structural tower and for lifting and positioning a wind turbine and associated blades on the top of the previously constructed and assembled structural tower. The present invention relates in particular to wind turbine applications, where the wind turbine is elevated to heights approaching eighty to one hundred meters or higher and where rotor diameters approach seventy meters or greater. Details of exemplary embodiments of the present invention are set forth below.

Figure 1:
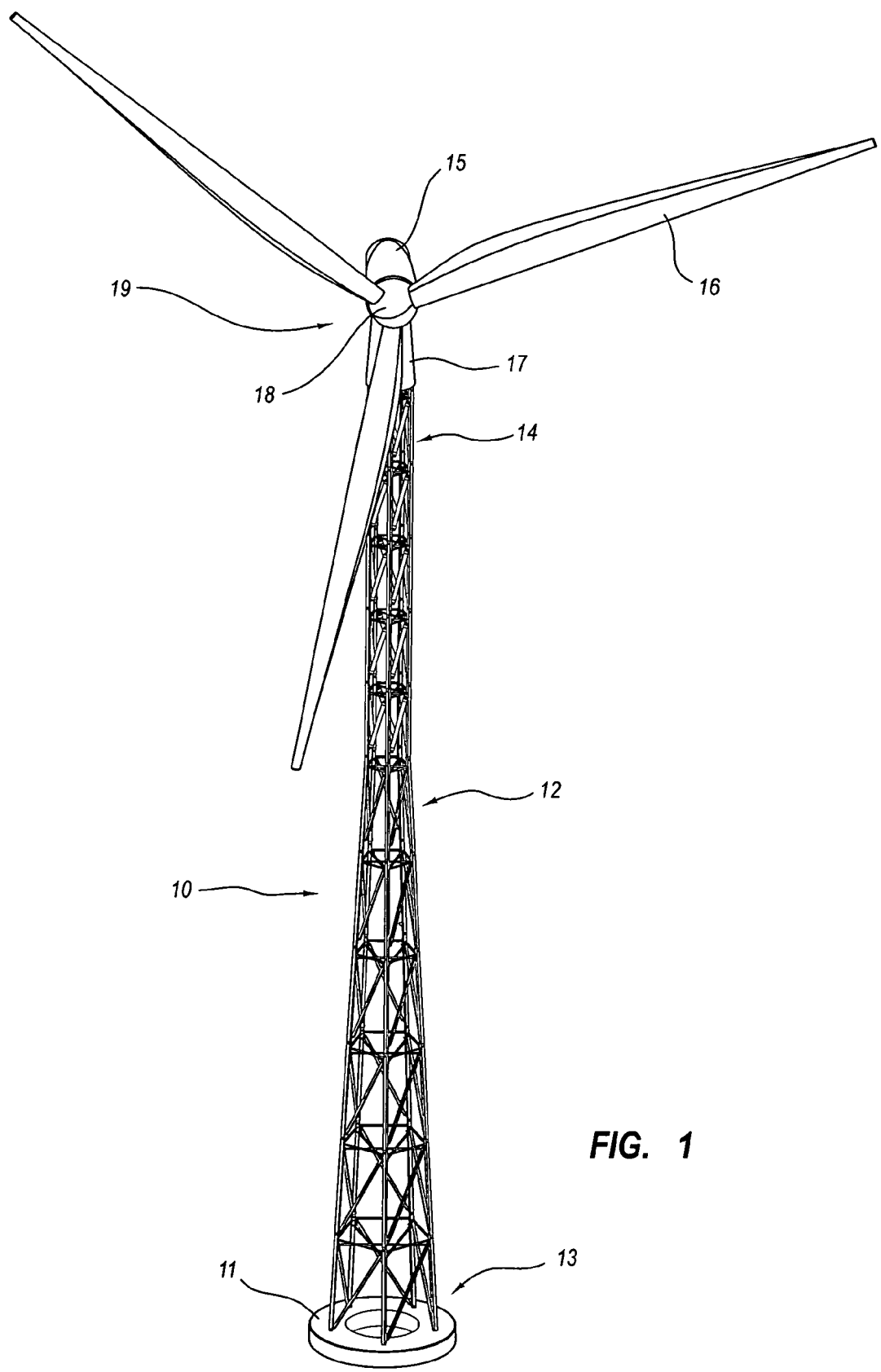
FIG. 1 illustrates a perspective view of a multiple-bay structural tower having a wind turbine assembly mounted thereon.

FIG. 1 illustrates a perspective view of a structural tower and wind turbine combination that is constructed and assembled using the present invention. Generally speaking, the structural tower 10 comprises a plurality of space frame sections also commonly called bay assemblies or bay sections 12, 13, 14 that are assembled, one on top of the other, to the desired height of the structural tower 10. The lowermost bay assembly 13 of the structural tower 10 is secured to a foundation 11. A series of intermediate 12 and upper 14 bay sections are assembled one on top of another to the desired height. The top bay section 17 may comprise a conventional tube-like bay section (as illustrated) or a space frame section (e.g., an upper bay section 14) and connects a wind turbine 15 to the top of the tower 10 using connections readily known to those skilled in the art. The wind turbine 15 carries a plurality of blades 16 mounted on a rotor 18 to form a blade assembly 19 that rotates in typical fashion in response to wind. Rotation of the blades 16 drives a generator (not illustrated) that is integral to the wind turbine 14 and typically used to generate electricity. As those skilled in the art will appreciate, the rotating plurality of blades 16 can be used for purposes other than generating electricity, such as, for example, driving a pump for pumping water or driving a mill for grinding grain. Further details of the components making up such high-elevation structural towers for wind turbine applications are presented in commonly-owned and pending U.S. patent application Ser. No. 11/433,147, the disclosure of which is incorporated in its entirety by this reference.

Figure 2:
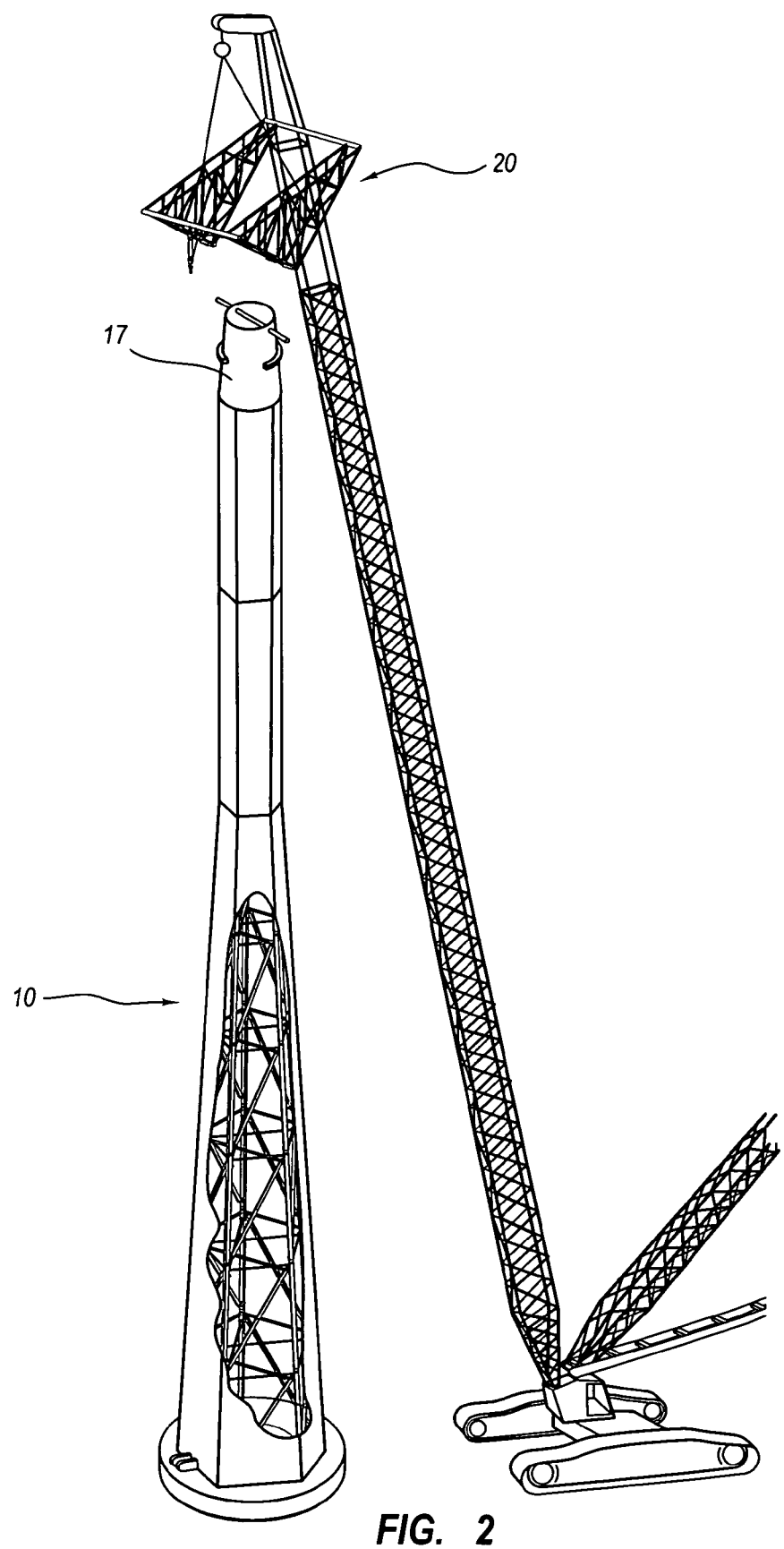
FIG. 2 illustrates a crane hoisting for assembly on top of the structural tower an embodiment of a lifting apparatus of the present invention.
Figure 3:
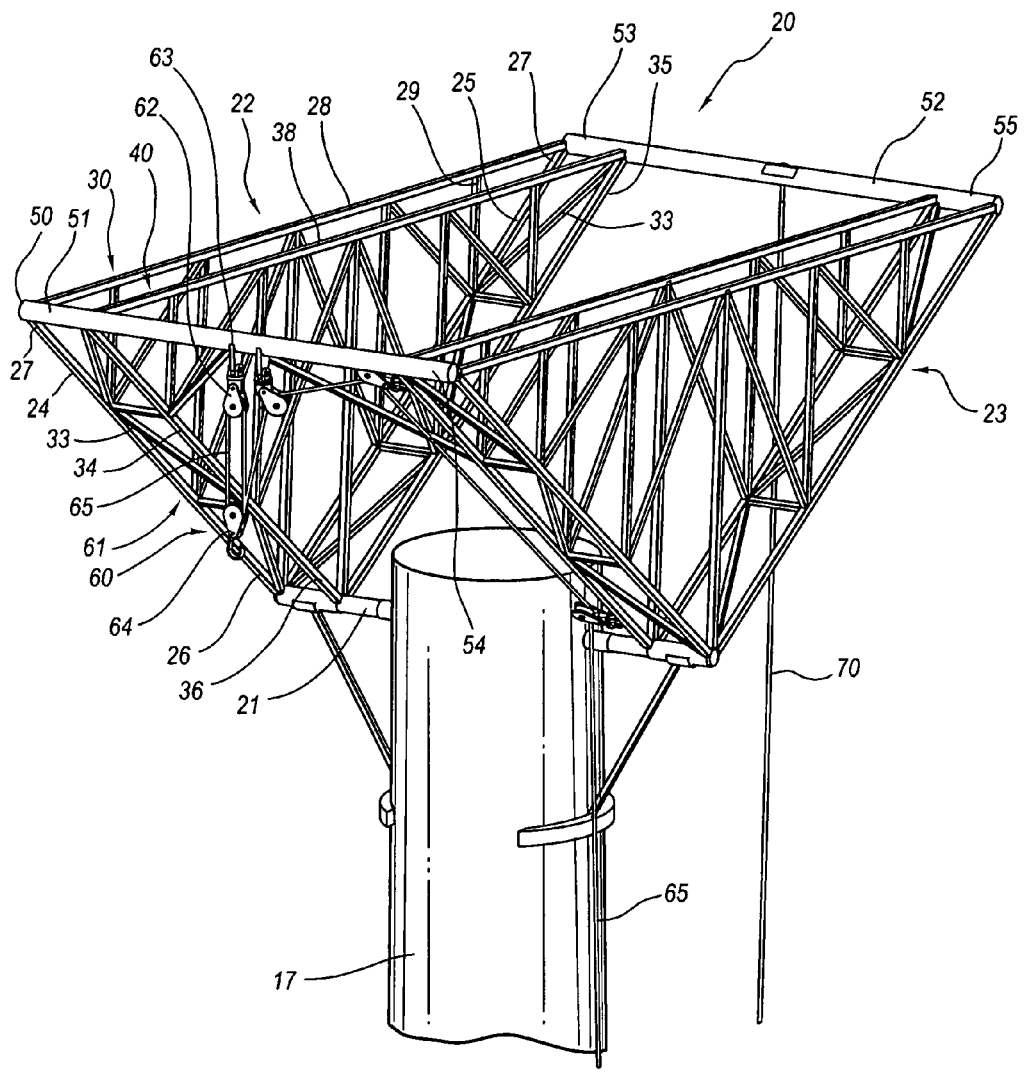
FIG. 3 illustrates an embodiment of a lifting apparatus of the present invention.
Figure 5:
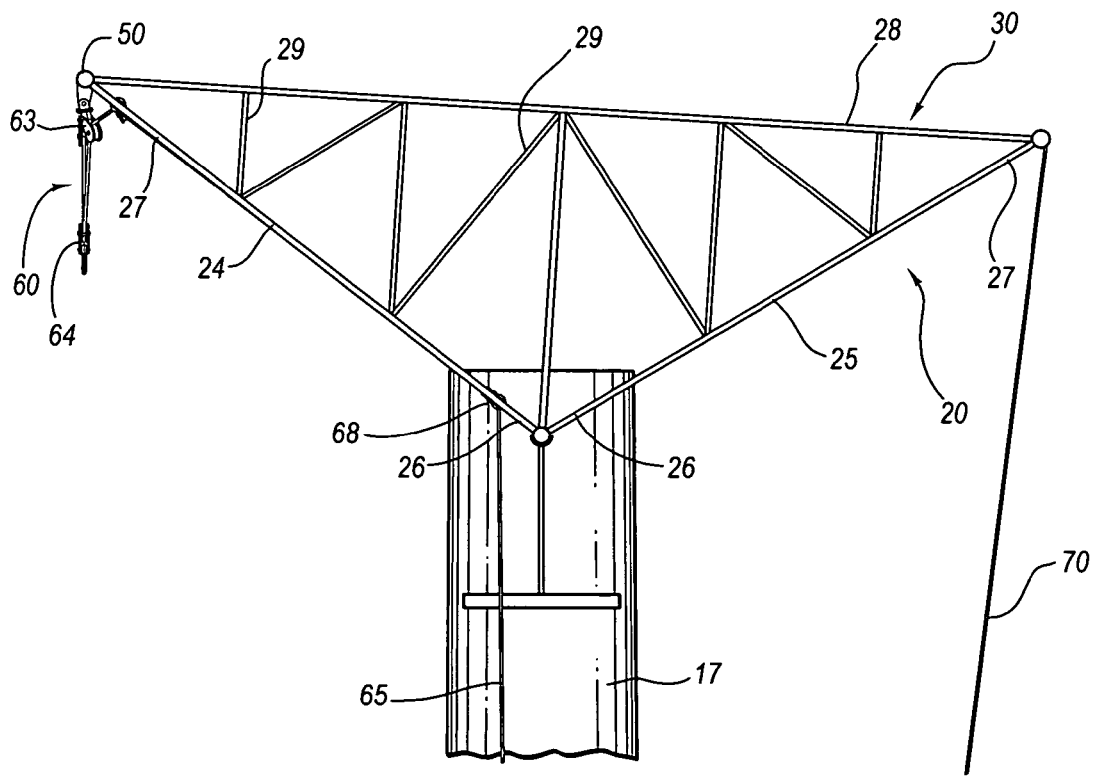
FIG. 5 illustrates a side view of the embodiment of the present invention depicted in FIG. 3.

FIG. 2 illustrates one embodiment of a lifting apparatus 20 of the present invention being hoisted by a crane for positioning upon the top bay section 17 of the structural tower 10. Referring more specifically to FIG. 3, the lifting apparatus is illustrated pivotally secured to the top bay section 17. The lifting apparatus 20 includes first 22 and second 23 lifting trusses that are mounted on a pivot shaft 21. The first 22 and second 23 lifting trusses are spaced on the pivot shaft 21 a distance 89 sufficient to permit the turbine 15 to pass between the lifting trusses when the lifting apparatus pivots about the shaft during the hoisting and positioning operations described below. The first lifting truss 22 includes first 24 and second 25 members having proximal ends 26 that are pivotally secured to the pivot shaft 21 and distal ends 27 that extend away from the pivot shaft 21; the distal end 27 of the first member 24 extending generally toward a fore direction (the hoisting side of the frame 20) and the distal end 27 of the second member 25 extending generally toward an aft direction of the frame 20. A third member 28 is secured to the distal ends 27 of the first 24 and second 25 members. Referring now to both FIGS. 3 and 5, the first 24 and second 25 members, together with the third member 28, are oriented generally in and comprise a first triangular structure 30. An array of internal truss elements 29 are disposed within and connected to the first 24 and second 25 members and the third member 28 that comprise the first triangular structure 30.

Figure 4:
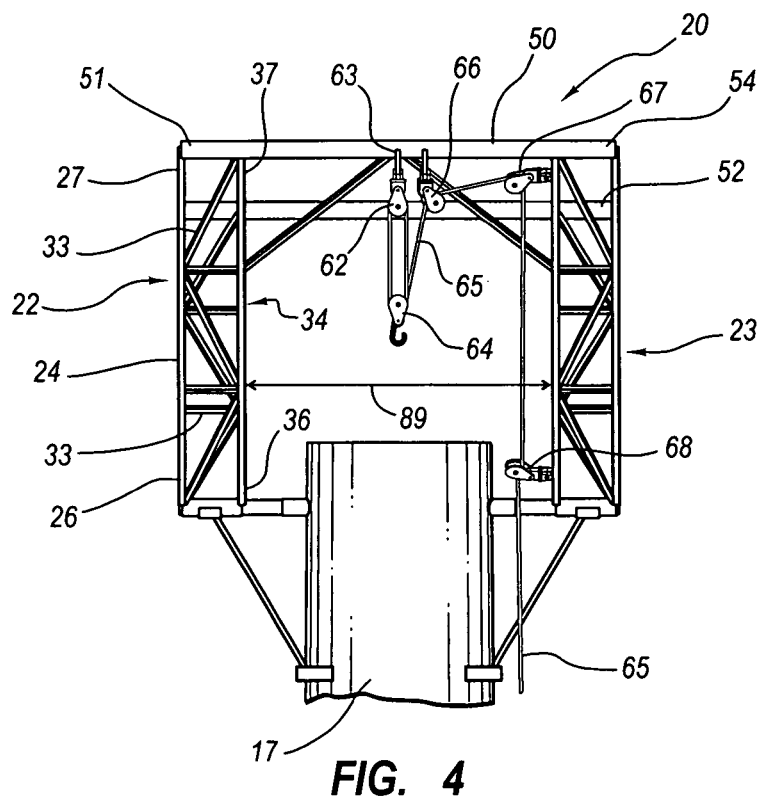
FIG. 4 illustrates a frontal view of the embodiment of the present invention depicted in FIG. 3.

If desired, the first lifting truss 22 may also include third 34 and fourth 35 members having proximal ends 36 that are pivotally secured to the pivot shaft and distal ends 37 extending away from the pivot shaft 21 in manner and direction similar to their counterparts comprising the first triangular structure 30. A sixth member 38 is secured to the distal ends 37 of the third 34 and fourth 35 members. The third 34 and fourth 35 members, together with the sixth member 38, are oriented generally in and comprise a second triangular structure 40. An array of internal truss elements 39 are disposed within and connected to the third 34 and fourth 35 members and the sixth member 38 that comprise the second triangular structure 40. An array of secondary internal truss elements 33 are disposed between and connect the first 30 and second 40 triangular structures to comprise the first lifting truss 22. The second lifting truss 23 is constructed in similar fashion to the first lifting truss 22. While construction details of the second lifting truss 23 are not repeated here, those having skill in the art will appreciate that the first 22 and second 23 lifting trusses may, or need not, be assembled in precisely the same way or share the exact same geometry. Further, those skilled in the art will appreciate that each lifting truss 22, 23 need not comprise both first and second triangular structures as described above, but could comprise a single triangular structure or two or more triangular structures, depending on the materials selected to construct the lifting apparatus 20 and the expected loads for the particular application. Finally, those skilled in the art will recognize that the lifting trusses need not assume triangular shapes as illustrated, but could be, for example, square, rectangular circular or semi-circular. With these qualifications in mind, the description proceeds generally with the embodiment illustrated in FIGS. 3-5.

Fore 50 and aft 52 transverse beams are positioned fore and aft of the first 22 and second 23 lifting trusses and connected thereto. The fore transverse beam 50 has a first end 51 positioned proximate the intersection of the first member 24 and the third member arm 28 of the first lifting truss 22 (and, if used, the intersection of the third 34 member and the sixth member 38). In similar fashion, the aft transverse beam 52 has a first end 53 positioned proximate the intersection of the second member 25 and the third member 28 of the first lifting truss 22 (and, if used, the intersection of the fourth 35 member and the sixth member 38). The fore 50 and aft 52 transverse beams have second ends 54, 55 that are positioned and connected to corresponding locations of the second lifting truss 23 in a manner similar to the positioning and connections of the first ends 51, 53 to the first lifting truss 22.

A rigging assembly 60 is secured to the fore transverse beam 50. The rigging assembly 60 comprises a block and tackle assembly 61 that is capable of affecting a mechanical advantage when lifting the turbine 15 and blades 16. More specifically, a first pulley assembly 62 is secured to a tab member 63 which is itself welded or otherwise securely attached to the fore transverse beam 50. A second pulley assembly 64 is positioned to hang downward from the first pulley assembly 62 when a cable 65 is threaded through the first 62 and second 64 pulley assemblies to form the block and tackle assembly 61. As those skilled in the art will appreciate, each of the first 62 and second 64 pulley assemblies may comprise any number of pulleys to affect the desired mechanical advantage (although, for simplicity, only one pulley for each assembly is illustrated). In the illustrated embodiment, the free end of the cable 65 is threaded through third 66, fourth 67 and fifth 68 pulleys. The third 66 and fourth 67 pulleys are positioned and connected to or adjacent the fore transverse beam 50, while the fifth pulley 68 is positioned and connected to the second truss assembly 23 adjacent the pivot shaft 21. Positioning of the fifth pulley 68 adjacent the pivot shaft as indicated permits the lifting apparatus 20 to pivot about the pivot shaft 21 without having to adjust the play on the cable 65 to compensate in response. A pivot control cable 70 is attached to the aft transverse beam 52. The pivot control cable 70 provides a means to hold the lifting apparatus 20 in a steady position while the turbine 15 or blades 16 are being hoisted by the rigging assembly 60 or to pivot the lifting apparatus 20 about the pivot shaft 21 to position the turbine 15 or blades into place as described herein below.

Referring now to FIGS. 6-9, the rigging assembly 60 and corresponding cable 65 and the pivot control cable 70 are illustrated hoisting the turbine 15 into place on the top bay assembly 17. The pivot control cable 70 is removed of excess play and adjusted so the lifting apparatus 20 is set into proper orientation with respect to the tower 10. Proper orientation requires the fore transverse beam 50 to extend radially outward from the tower 10 a distance sufficient to prevent the turbine 15 or blades 16 from contacting the tower 10 during the hoisting process. The pivot control cable 70 has a second end 71 that may extend through one or more wheels 72 that are rotatably secured to the foundation 11 or to an auxiliary foundation (not illustrated). The second end 71 ultimately extends to a winch 73 that reels in or out the pivot control cable 70, thereby pivoting the lifting apparatus 20 about the pivot shaft 21.

Once the lifting apparatus 20 is positioned in proper orientation, the turbine 17 is placed into position proximate the base of the tower 10 using a crane or other suitable means. The rigging assembly 60 is then brought into position adjacent the turbine 15 and the second pulley assembly 64 is secured to the turbine 15. In a manner similar to the pivot control cable 70, the cable 65 corresponding to the rigging assembly 60 has a second end 75 that may extend through one or more wheels 76 that are rotatably secured to the foundation 11 or to an auxiliary foundation (not illustrated). The second end 75 ultimately extends to a winch (not illustrated) that reels in or out the cable 65, thereby operating the block and tackle assembly 61 and hoisting or lowering the second pulley assembly 64 with respect to the ground or the foundation 11.

Figure 8:
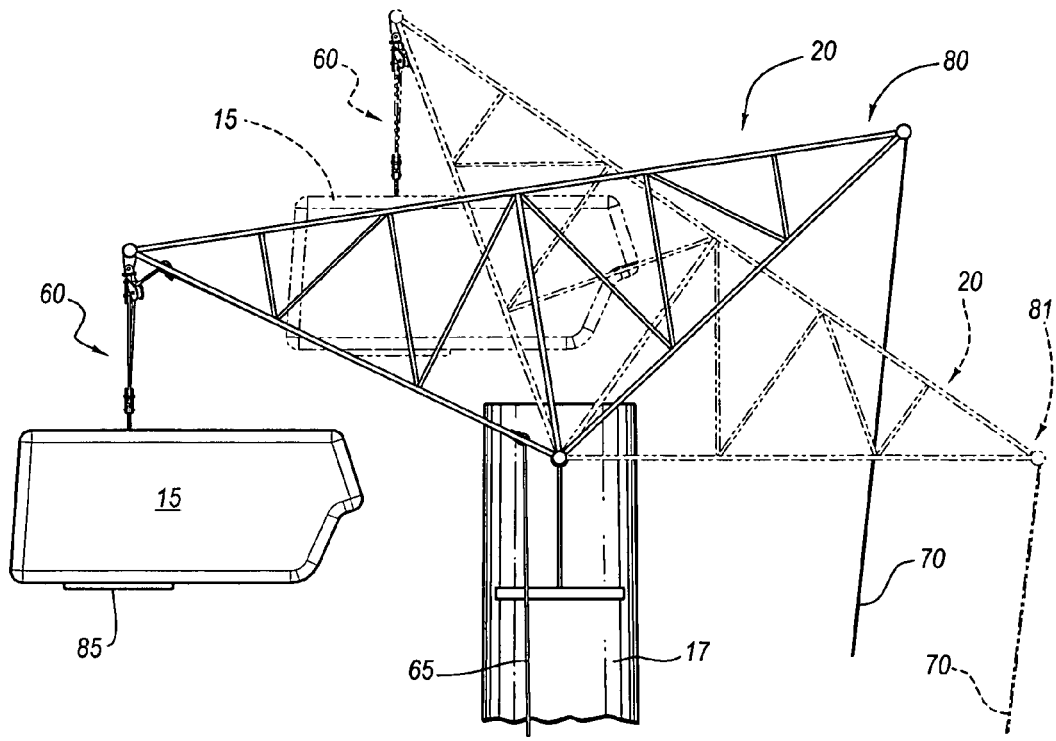
FIG. 8 illustrates the embodiment of the present invention depicted in FIG. 3 pivoting to bring the turbine into position for attachment to the structural tower.
Figure 9:
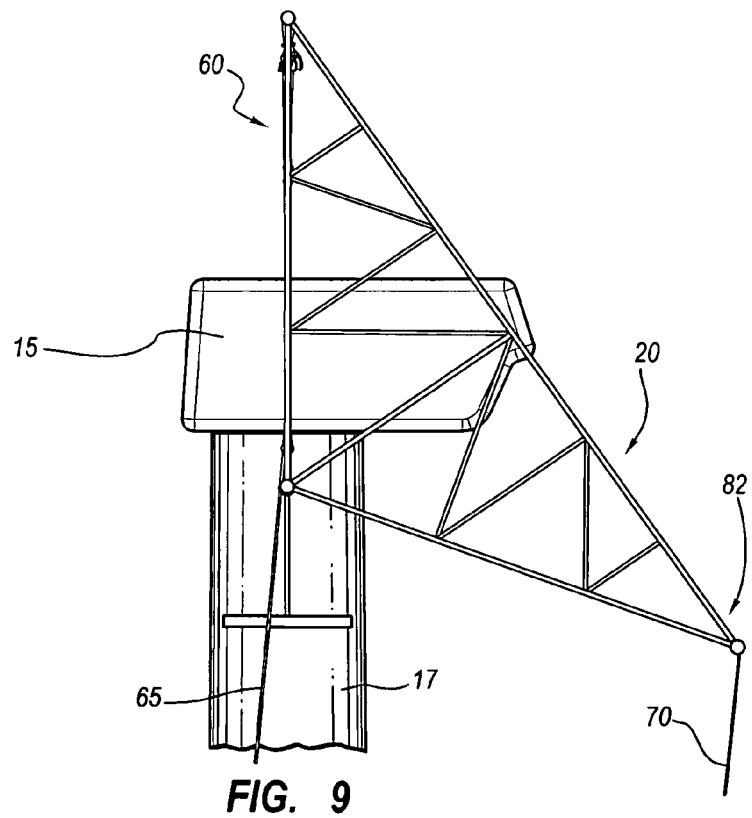
FIG. 9 illustrates the embodiment of the present invention depicted in FIG. 3 after lowering the turbine in position for attachment to the structural tower.

Referring now to FIGS. 8 and 9, the turbine 15 is illustrated being positioned upon the top bay assembly 17 through operation of the lifting apparatus 20. Referring to FIG. 8, the turbine is illustrated adjacent the fore side of the top bay assembly 17, following orientation of the lifting apparatus 20 and hoisting of the turbine 15 through operation of the pivot control cable 70 and rigging assembly 60 as previously described. As illustrated in FIGS. 8 and 9, following hoisting of the turbine 15, the pivot control cable 70 is reeled in through operation of the corresponding winch, thereby pivoting the lifting apparatus 20 from a first position 80 through an intermediate position 81 and then to a final position 82. At the final position 82, a mounting structure 85 at the base of the turbine 15 sits directly above the top bay assembly 17. The rigging assembly cable 65 is then reeled out through operation of its corresponding winch, thereby lowering the turbine 15 into position upon the top bay assembly 17. The turbine 15 is then secured to the top bay assembly 17 through the mounting structure 85 positioned at the base of the turbine 15 and corresponding mounting structure (not illustrated) positioned at the upper end of the top bay assembly 17. Once the turbine 17 is secured to the top bay assembly 17, the rigging assembly cable 65 is slackened and the second pulley 64 of the rigging assembly 60 removed from the turbine 15.

Figure 12:
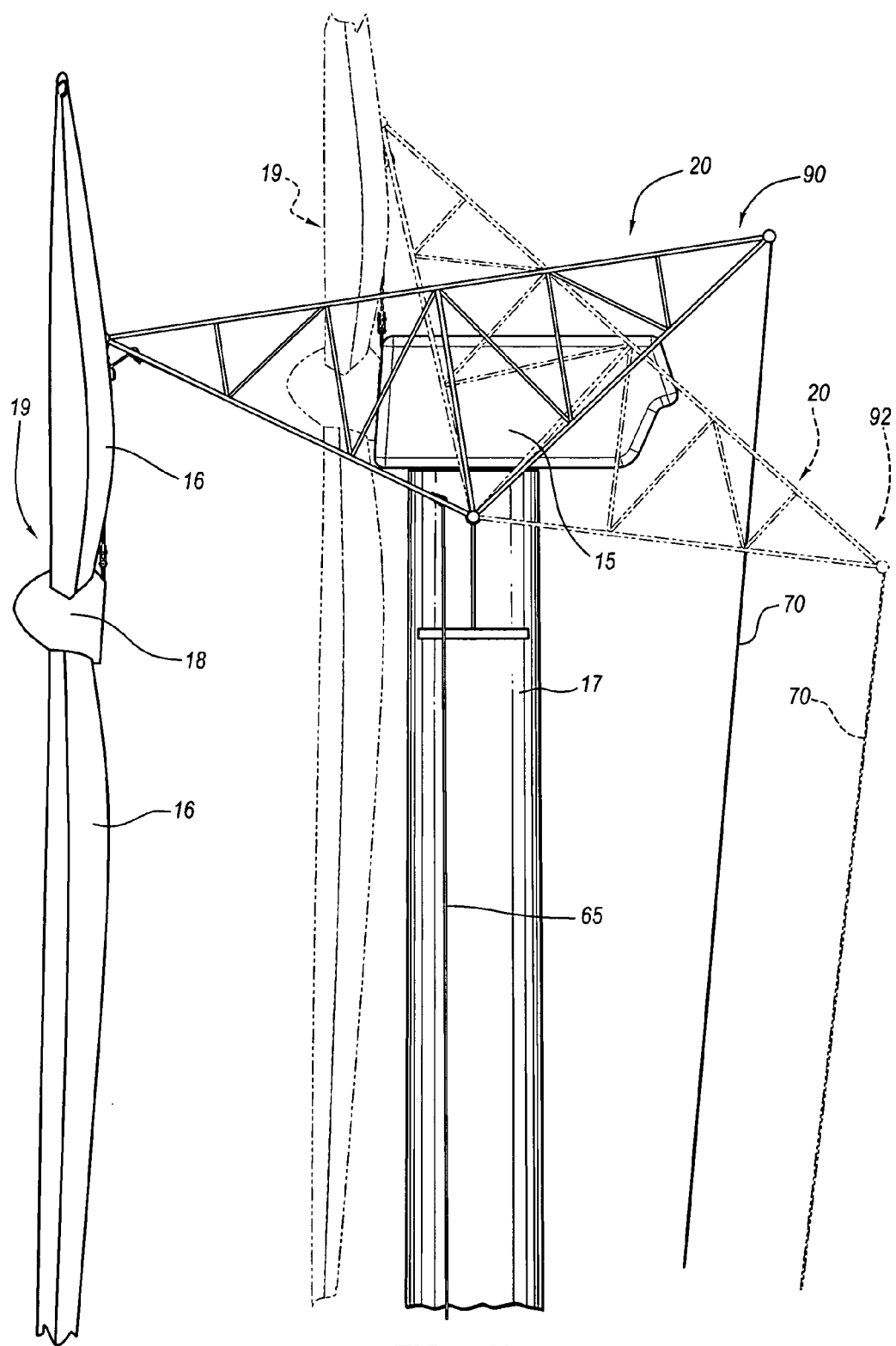
FIG. 12 illustrates the embodiment of the present invention depicted in FIG. 3 pivoting to bring the blade assembly into position for attachment to the driven shaft of the turbine.

Referring now to FIGS. 10-12, the rigging assembly 60 and corresponding cable 65 and the pivot control cable 70 are illustrated hoisting the blades 16 into place on the turbine 15. The steps are similar to those just described with respect to hoisting and positioning the turbine 15. The pivot control cable 70 is removed of excess play and adjusted so the lifting apparatus 20 is set into proper orientation with respect to the tower 10. Once the lifting apparatus 20 is positioned in proper orientation, the blades 16 are assembled onto the blade rotor 18 and the resulting blade assembly 19 is placed into position proximate the base of the tower 10 using a crane or other suitable means. The rigging assembly 60 is then brought into position adjacent the turbine 15 and the second pulley assembly 64 is secured to the blade assembly 19. The blade assembly 19 is then hoisted to the top of the tower 10 in a fashion similar to that above described respecting hoisting of the turbine 15.

Referring now to FIG. 12, the blade assembly 19 is illustrated being secured to the turbine 15 through operation of the lifting apparatus 20. Specifically, the blade assembly 19 is illustrated adjacent the fore end of the turbine 15, following orientation of the lifting apparatus 20 and hoisting of the blade assembly 19 through operation of the pivot control cable 70 and rigging assembly 60 as previously described. Following hoisting of the blade assembly 19, the pivot control cable 70 is reeled in through operation of the corresponding winch, thereby pivoting the lifting apparatus 20 from a first position 90 through an intermediate position and then to a final position 92. At the final position 92, the rotor 18 of the blade assembly 19 is secured to a driven shaft (not illustrated) protruding from the turbine 15. Once the blade assembly 19 is secured to the driven shaft on the turbine 15, the rigging assembly cable 65 is slackened and the second pulley 64 of the rigging assembly 60 removed from the blade assembly 19.

Following complete installation of the turbine 15 and blade assembly 19 and removal of the rigging apparatus 60, the lifting apparatus is removed using the same crane employed to construct the tower and hoist and install the lifting apparatus on the top bay assembly 17. Although a crane is suggested as one means for raising and lowering the lifting apparatus 20, those skilled in the art should appreciate that other means for accomplishing the raising and lowering the lifting apparatus 20 may be employed to that end. For example, a ginpole such as one commonly used in the telecommunications industry to erect communication towers could be used to not only erect the tower, but to raise and lower the lifting apparatus 20. Another means is a helicopter equipped to lift heavy loads. Such helicopters are used, for example, in the installation of heavy towers used in ski resorts where mountainous terrain makes access difficult and installation cumbersome and expensive using other means.

Figure 13:
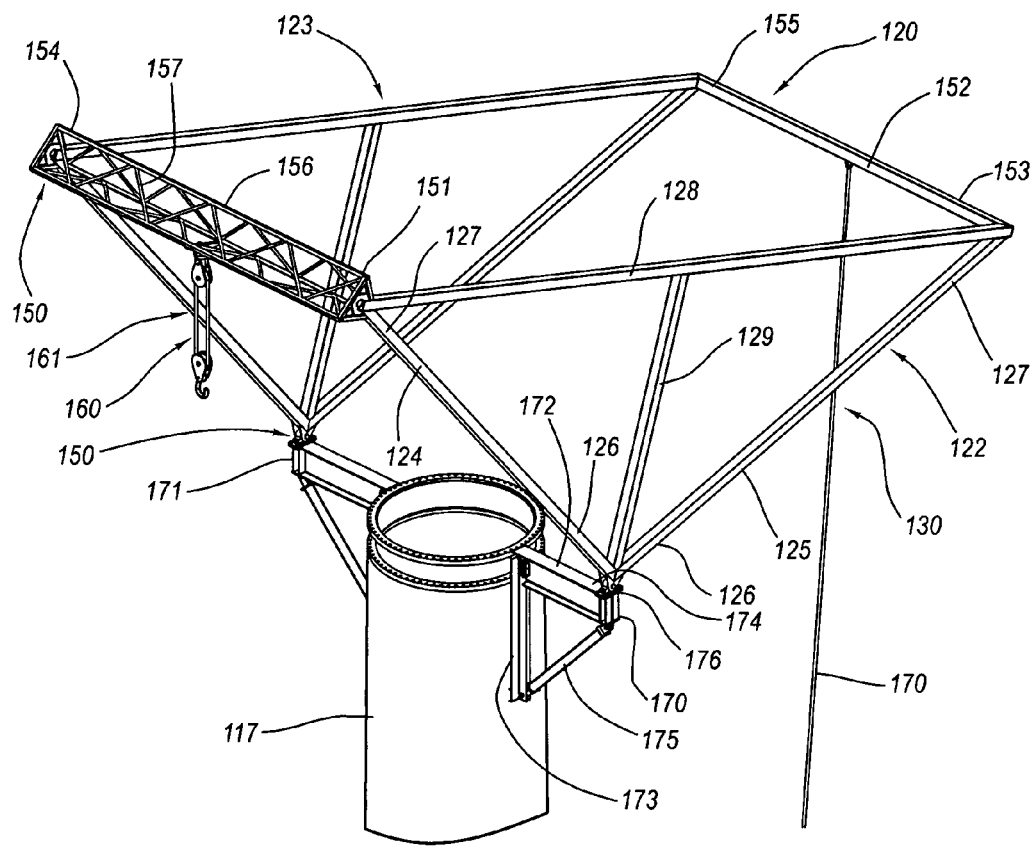
FIG. 13 illustrates a further embodiment of the lifting apparatus of the present invention

While the foregoing description provides details relating to lifting apparatuses mounted to structural towers using a pivot shaft or similar structure, the following description provides details relating to other embodiments of lifting apparatuses and means for attaching the lifting apparatuses to both tube-like and space-frame structural towers. Referring to FIG. 13, for example, a partially exploded view of a lifting apparatus secured to a pair of radially extending beams is illustrated. More specifically, a lifting apparatus 120 comprises a first 122 and second 123 lifting trusses. The first lifting truss 122 includes first 124 and second 125 members having proximal ends 126 that are secured to a bearing assembly 121 and distal ends 127 that extend away from the bearing assembly 150; the distal end 127 of the first member 124 extending generally toward a fore direction (the hoisting side of the apparatus 120) and the distal end 127 of the second member 125 extending generally toward an aft direction of the apparatus 120. A third member 128 is secured to the distal ends 127 of the first 124 and second 125 members. The first 124 and second 125 members, together with the third member 128, are oriented generally in and comprise a first triangular structure 130. An internal truss element 129 is disposed within and connects the proximal ends 126 of the first 124 and second 125 members and an intermediate portion of the third member 128 that comprise the first triangular structure 130.

The second lifting truss 123 is constructed in similar fashion to the first lifting truss 122. While construction details of the second lifting truss 123 are not repeated here, those having skill in the art will appreciate that the first 122 and second 123 lifting trusses may, or need not, be assembled in precisely the same way or share the exact same geometry. Further, those skilled in the art will appreciate that each lifting truss 122, 123 need not comprise single triangular structures as described above, but could comprise a single triangular structure or two or more triangular structures, depending on the materials selected to construct the lifting frame 120 and the expected loads for the particular application. Finally, those skilled in the art will recognize that the lifting trusses need not assume triangular shapes as illustrated, but could be, for example, square, rectangular circular or semi-circular.

Fore 150 and aft 152 transverse beams (or a multi-beam structure as illustrated) are positioned fore and aft of the first 122 and second 123 lifting trusses and connected thereto. The fore transverse beam 150 has a first end 151 positioned proximate the intersection of the first member 124 and the third member 128 of the first lifting truss 122. In similar fashion, the aft transverse beam 152 has a first end 153 positioned proximate the intersection of the second member 125 and the third member 128 of the first lifting truss 122. The fore 150 and aft 152 transverse beams have second ends 154, 155 that are positioned and connected to corresponding locations of the second lifting truss 123 in a manner similar to the positioning and connections of the first ends 151, 153 to the first lifting truss 122. The fore transverse beam 150 comprises a plurality of transverse beam elements 156 that are, in one embodiment, arranged in triangular cross sectional layout as illustrated. The transverse beam elements 156 are interconnected by a plurality of internal truss elements 157 to provide support for the transverse beam elements 156. A rigging assembly 160 is secured to the fore transverse beam 150 and, similar to the above description, comprises a block and tackle assembly 161 that is capable of affecting a mechanical advantage when lifting the turbine 15 and blades 16. A pivot control cable 170 is attached to the aft transverse beam 152 and provides a means to hold the lifting apparatus 120 in a steady position while the turbine 15 or blades 16 are being hoisted by the rigging assembly 160 or to pivot the lifting apparatus 120 to position the turbine 15 or blades into place as described above.

Similar to the description above, the lifting apparatus 120 is secured to the top bay assembly 117 of a structural tower. Secured to the top bay assembly are first 170 and second 171 radially extending beams. The first radially extending beam 170 has a first end 172 secured to an axial side beam 173 that is itself secured the top bay assembly 117. The first radially extending beam 170 has a second end 174 that extends substantially radially outward from the top bay assembly 117. An angle brace 175 is secured to and extends between the second end 174 and a lower end of the axial side beam 173. Secured to the top of the second end 174 of the first radially extending beam 170 is a bearing mounting bracket 176 for mounting of the bearing assembly 150. While FIG. 13 illustrates the first 170 and second 171 radial beam members extending in true radial direction from an assumed central axis of the top bay assembly, those skilled in the art should appreciate that the members need not extend outward in true radial fashion but, instead, may be angled fore or aft with respect to such centerline. Further, the members need not be secured to the top bay assembly 117 separated by 180 degrees as illustrated but, instead, may be offset either fore or aft.

Figure 14:
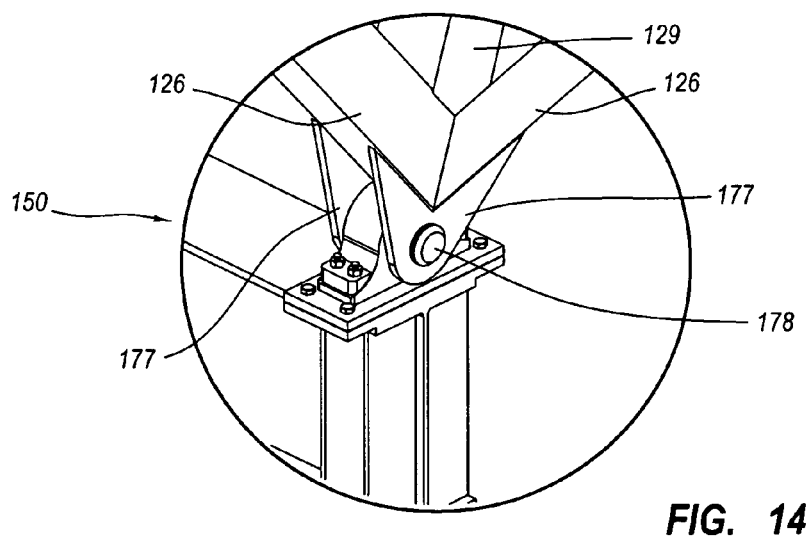
FIG. 14 illustrates a close-up view of a bearing assembly used to mount a lifting frame to a support frame member.

As illustrated in FIG. 14, the bearing assembly 150 for the first radially extending member 170 is mounted to the mounting bracket 176. The proximal ends 126 of the first 124 and second 125 members and the internal truss element 129 meet at a common vertex and are themselves secured to a pair of tab members 177. A pin 178 extends through the tab members 177 and the bearing assembly 150. When bearing assemblies 150 are positioned on the ends of the first 170 and second 171 radially extending members and incorporated into the lifting apparatus 120 as described, the lifting apparatus is pivotable about the pins extending through the bearing assemblies 150 in response to movement of the pivot control cable 170.

Figure 15:
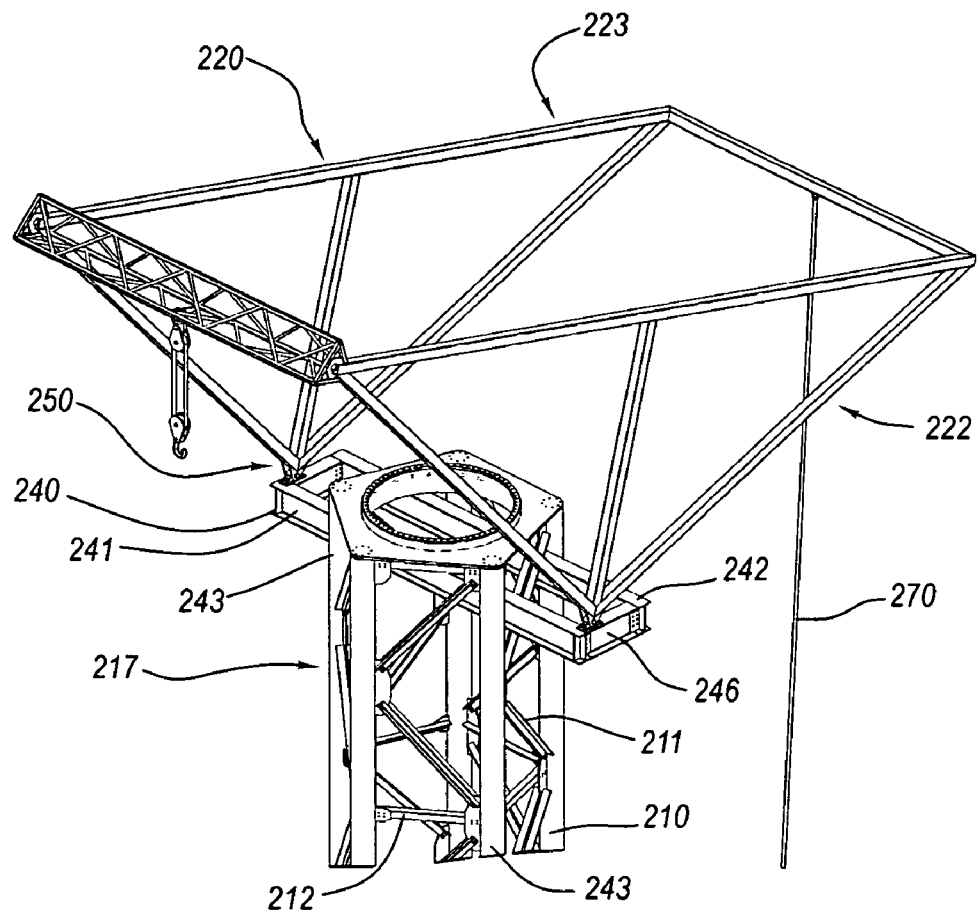
FIG. 15 illustrates an embodiment of the lifting frame of the present invention and the frame used to secure the lifting frame to a space frame tower.
Figure 16:
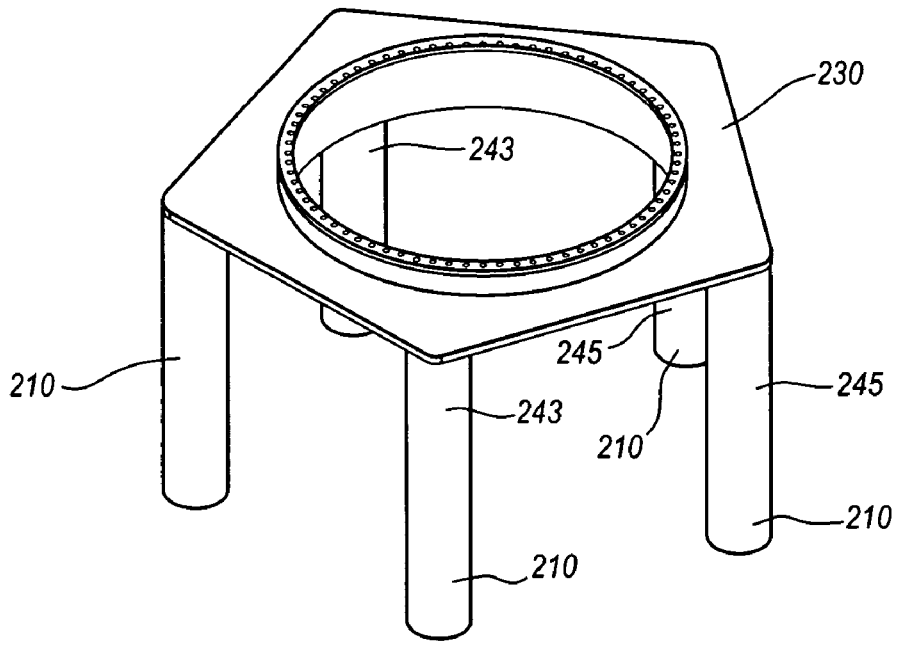
FIG. 16 illustrates a turbine mounting structure secured to longitudinal members of a space frame tower.
Figure 17:
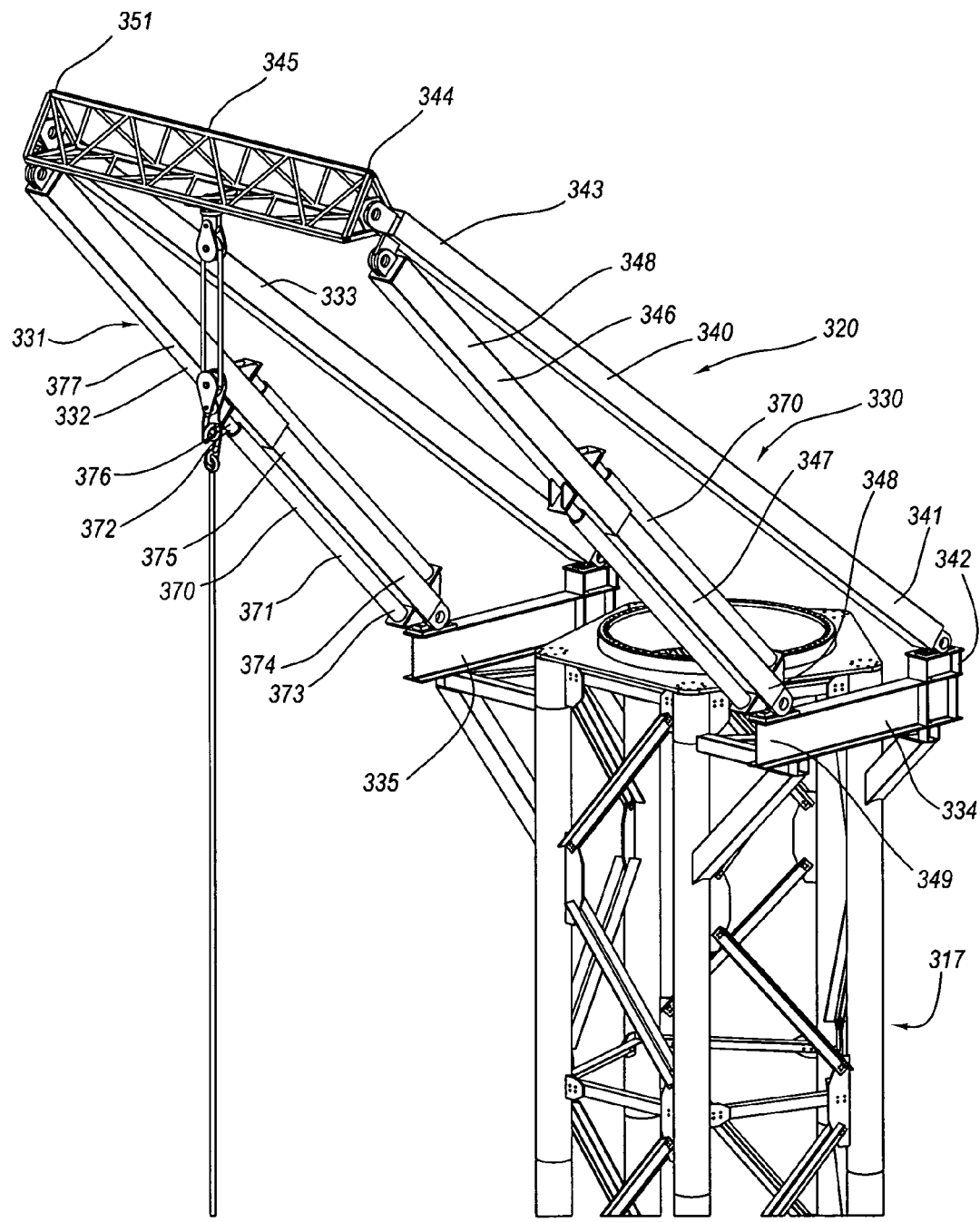
FIG. 17 illustrates a further embodiment of the lifting frame of the present invention.

Referring now to FIGS. 15 and 16, a further embodiment of a lifting apparatus of the present invention is illustrated, in this instance connected to and operational with the top bay assembly 217 of a space frame tower. As disclosed in commonly-owned and pending U.S. patent application Ser. No. 11/433,147, a space frame tower for wind turbine applications comprises a plurality of upwardly extending longitudinal members 210 interconnected by diagonal 211 and horizontal 212 members or struts. Disclosed as part of the present invention is the use of a ring member 230 that is configured to accept and mate to mounting structure positioned at the base of the turbine 15, and is further configured to connect to the uppermost ends of the upwardly extending longitudinal members 210 that comprise the top bay assembly 217. A support frame 240 is positioned beneath the ring member 230. The support frame 240 has a transverse dimension sufficient to extend through the top bay assembly 217 and support first 222 and second 223 lifting trusses of a lifting apparatus 220 constructed as previously described. The support frame 240 comprises fore 241 and aft 242 transverse support members. In one embodiment, the fore transverse support member 241 is secured to an opposing pair 243 of longitudinal members 210 and the aft transverse support member is secured to an adjacent opposing pair 245 of the longitudinal members 210. Supporting cross braces 246 are disposed at the ends of the fore 241 and aft 242 transverse support members. Bearing assemblies 250 are then disposed on the supporting cross braces 246 or the fore 241 and aft 242 transverse support members. When bearing assemblies 250 are positioned on the supporting cross braces 246 or the fore 241 and aft 242 transverse support members and incorporated into the lifting apparatus 220 as described previously, the lifting apparatus is pivotable about pins extending through the bearing assemblies 250 in response to movement of the pivot control cable 270.

Referring now to FIGS. 17-22, a further embodiment of a lifting apparatus 320 of the present invention, connected to and operational with a top bay assembly 317 of a space frame tower, is disclosed. The lifting apparatus 320 comprises first 330 and second 331 lifting trusses, each truss generally comprising a telescoping 332 and a non-telescoping 333 member. First 334 and second 335 supporting frame members are connected to and disposed on the sides of the top bay assembly 317. More specifically, the first lifting truss 330 comprises a non-telescoping member 340 having a first end a first end 341 pivotally connected to an aft portion 342 of the first 334 supporting frame member and a second end 343 pivotally connected to first end 344 of a transverse beam 345. The first lifting truss 330 further comprises a telescoping member 346 having an inner telescoping member 347 and an outer telescoping member 348. The inner telescoping member 347 has a first end 348 pivotally connected to a fore portion 349 of the first 334 supporting frame member. The outer telescoping member 348 has a first end 350 pivotally connected to the second end 338 of the non-telescoping member 340. The second lifting truss 331 comprises similar telescoping and non-telescoping members described above with respect to the first hydraulic lifting truss 330. The members are pivotally secured at one set of ends to the second supporting frame member 335. At the other ends, the non-telescoping member is connected to a second end 351 of the transverse beam 345, while the telescoping member is connected to the end of the non-telescoping member that is itself connected to the second end 351 of the transverse beam 345. Those having skill in the art will appreciate that supporting frame members 334 and 335 have a length and whose ends may be extended fore or aft of the top bay assembly 317 so as to reduce undesirable bending moments or other loads occurring in the tower when hoisting the wind turbine or blades. While not illustrated, one approach to reducing the bending moment, at the expense of increasing the axial load, is to extend the ends of the supporting frame members 334 and 335 aft of the top bay assembly and attaching a counterbalance weight or cable tension to offset the hoisting loads being experienced due to hoisting of the turbine equipment. This approach, or variations thereof, may, moreover, be incorporated into any of the embodiments disclosed herein and above.

As illustrated in FIGS. 17-20, when constructed in the fashion above described, the transverse beam 339 of the lifting apparatus 320 is pivotable between a first position 360 extending fore of the top bay assembly 317 and a second position 362 extending substantially vertically above the top bay assembly 317. Control of the pivoting movement arises through a pair of hydraulic rams 370 that are operably connected to the telescoping members of each of the first 330 and second 331 lifting trusses. Each hydraulic ram 370 includes a cylinder unit 371 and a piston unit 372. Each cylinder unit 371 includes an end 373 that is connected to the inner member 374 of a corresponding telescoping member 375 and each piston unit 372 includes an end 376 that is connected to the outer member 377 of a corresponding telescoping member 375.

Figure 19:
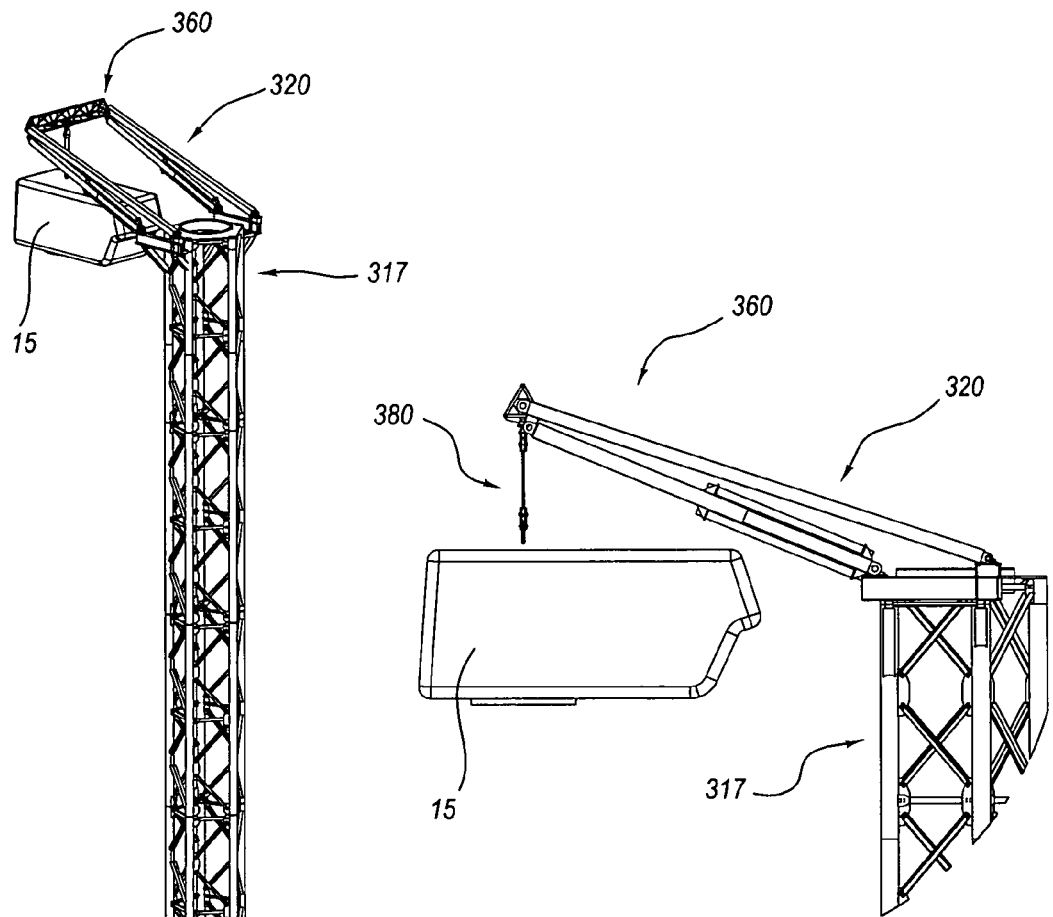
FIG. 19 illustrates a close-up side view of the embodiment of the present invention depicted in FIG. 17 after hoisting a turbine to the top of a tower.
Figure 18:
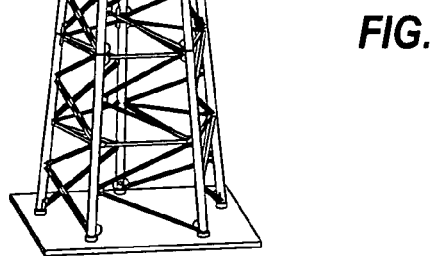
FIG. 18 illustrates the embodiment of the present invention depicted in FIG. 17 after hoisting a turbine to the top of a tower.
Figure 20:
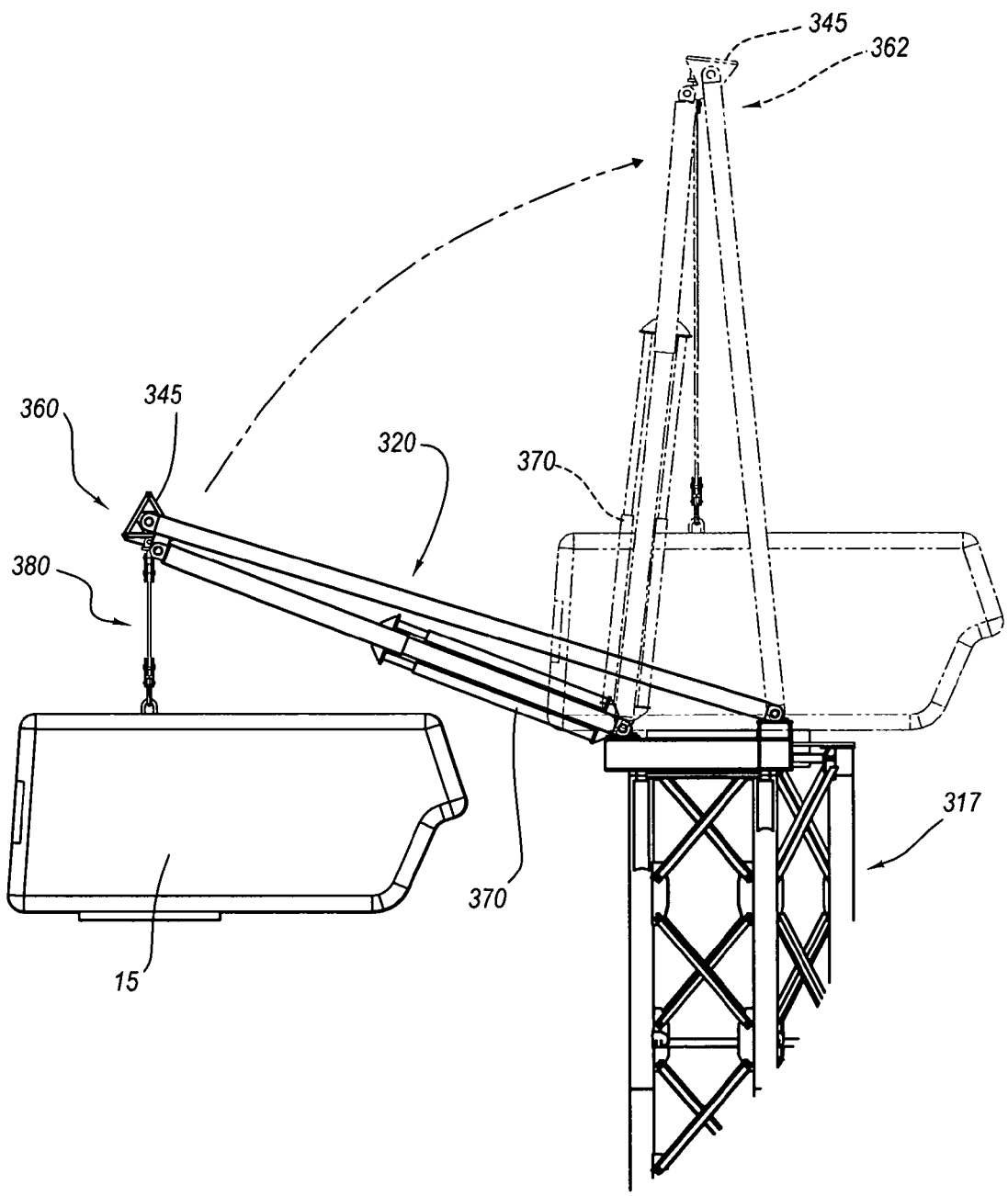
FIG. 20 illustrates the embodiment of the present invention depicted in FIG. 17 pivoting to bring the turbine into position for attachment to the structural tower.
Figure 21:
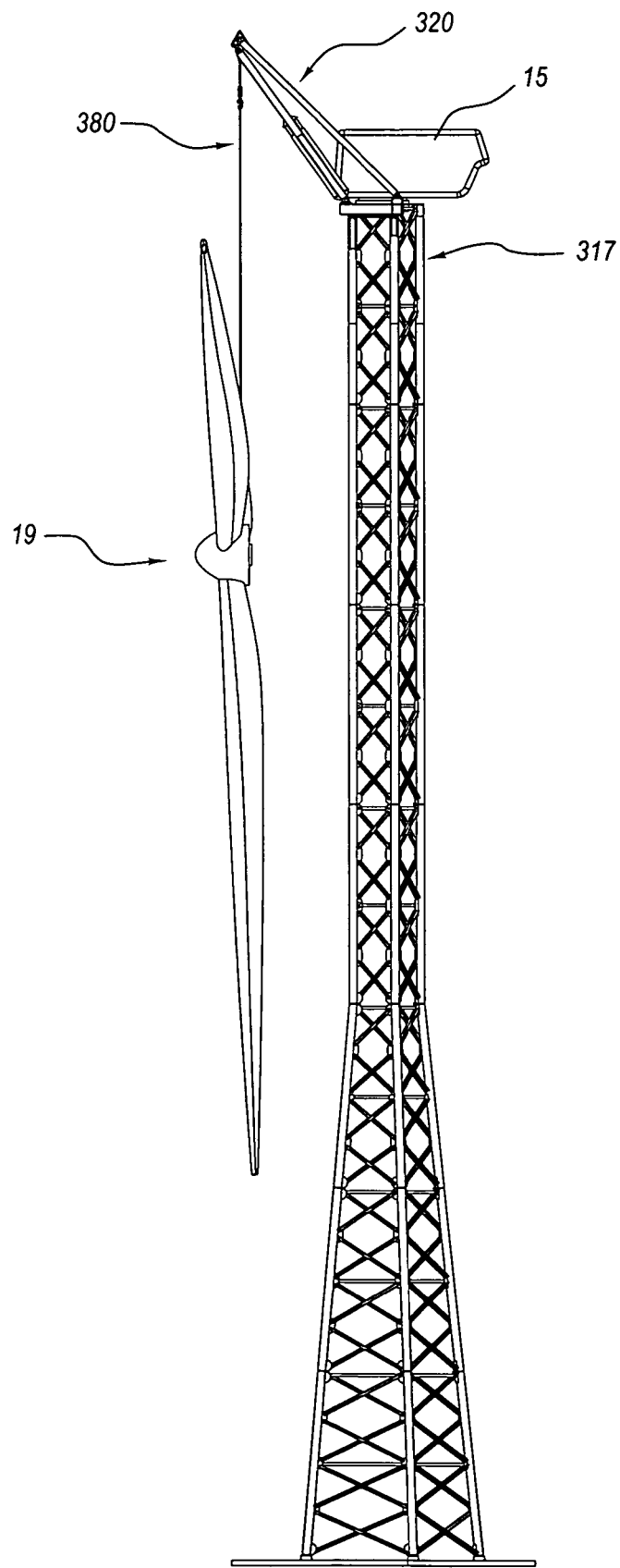
FIG. 21 illustrates the embodiment of the present invention depicted in FIG. 17 hoisting a blade assembly to the top of a tower.
Figure 22:
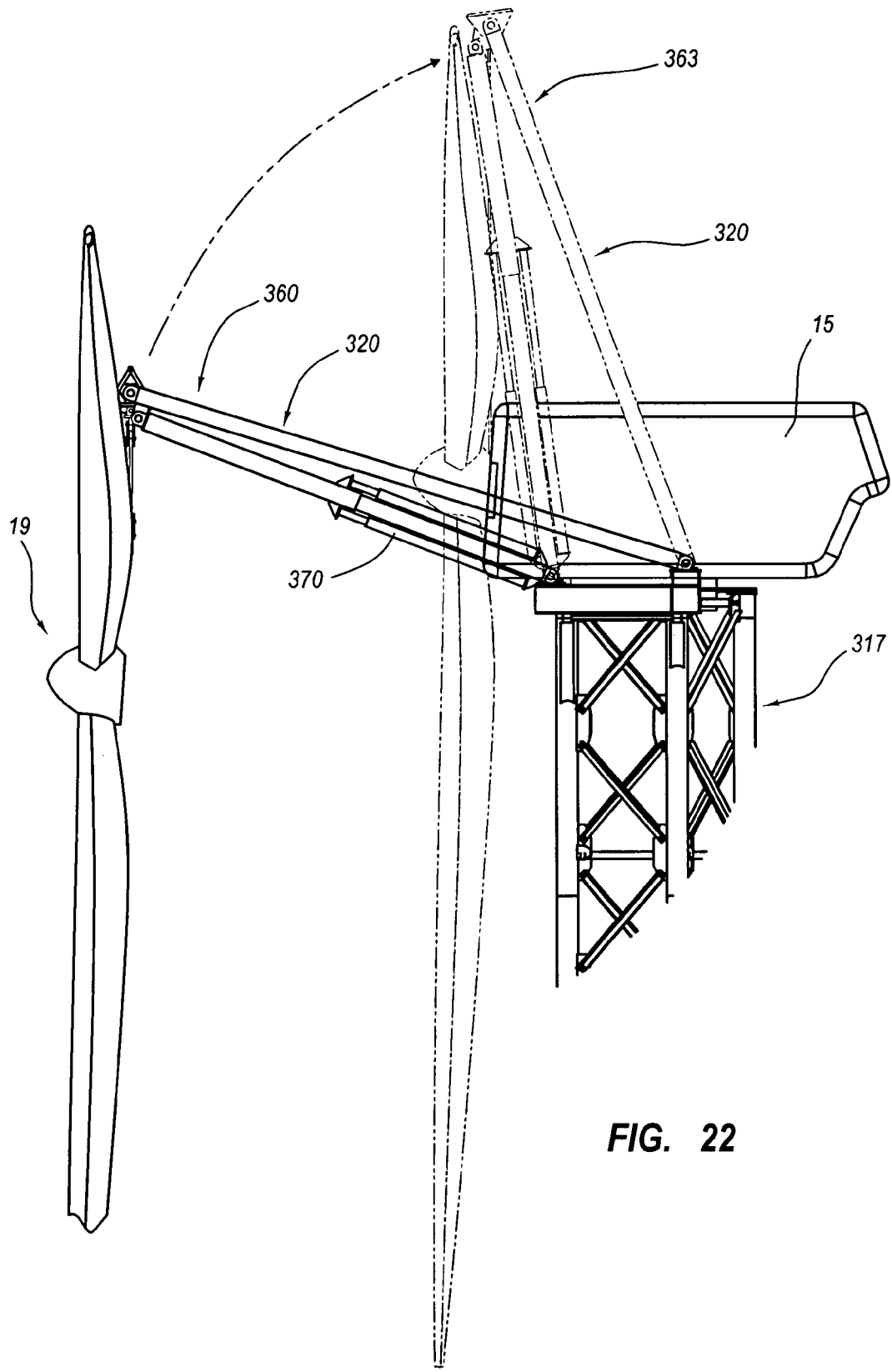
FIG. 22 illustrates the embodiment of the present invention depicted in FIG. 17 pivoting to bring the blade assembly into position for attachment to the structural tower.
Figure 23:
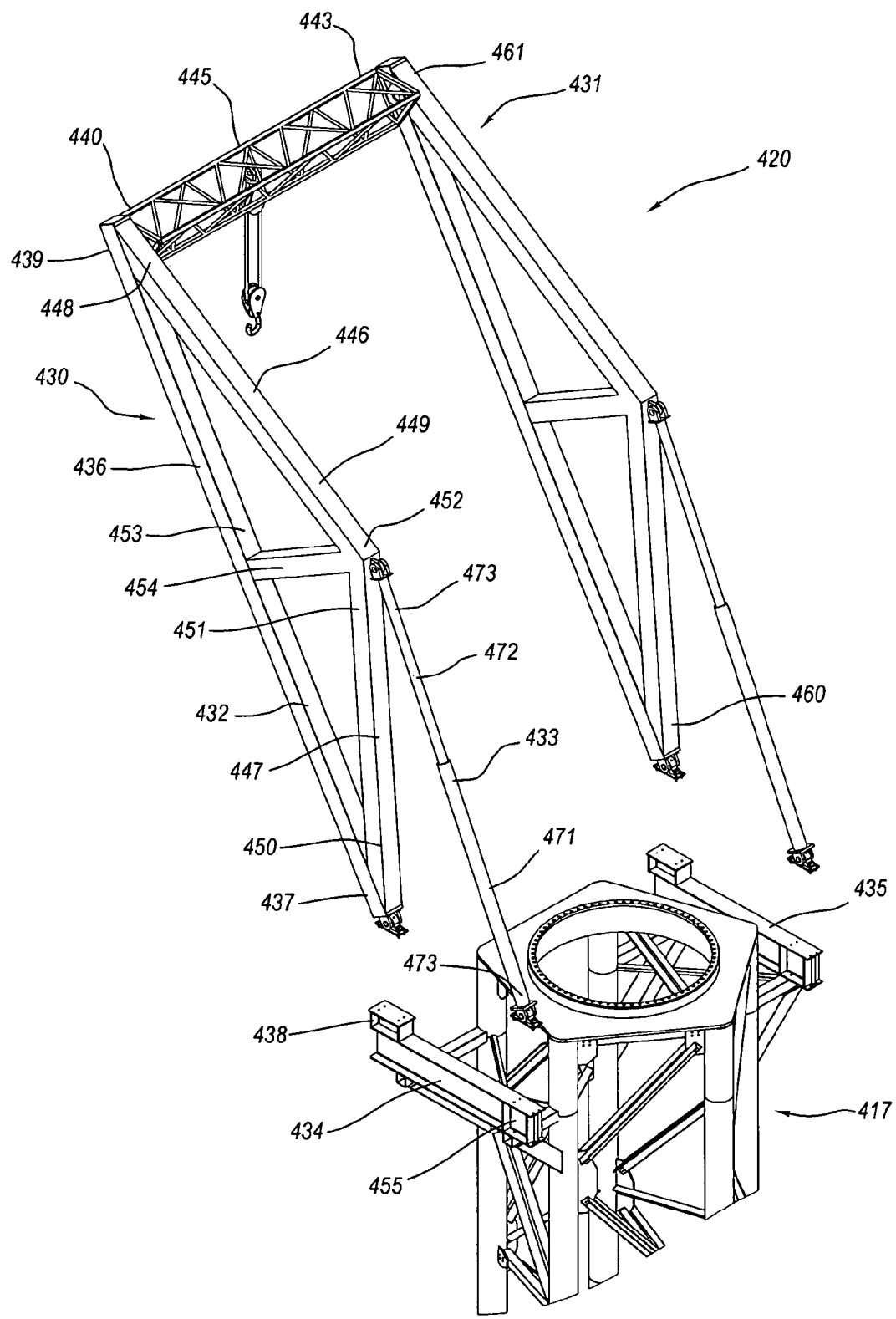
FIG. 23 illustrates a further embodiment of the lifting frame of the present invention.
Figures 24, 25:
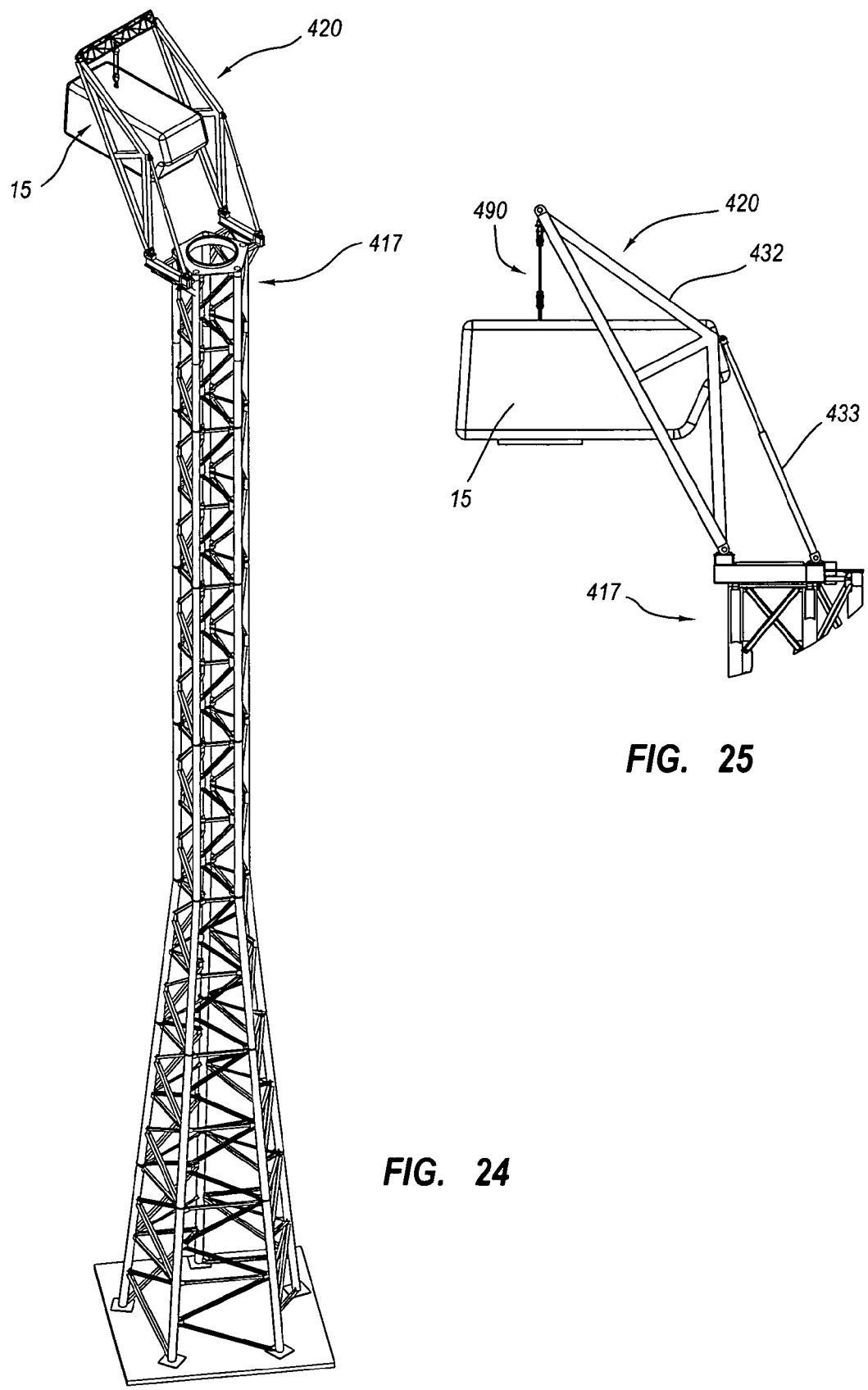
FIG. 24 illustrates the embodiment of the present invention depicted in FIG. 23 after hoisting a turbine to the top of a tower.
FIG. 25 illustrates a close-up side view of the embodiment of the present invention depicted in FIG. 23 after hoisting a turbine to the top of a tower.

When the hydraulic rams 370 are in a retracted position, the lifting apparatus 320 assumes a first position 360 with the transverse beam 345 extending fore of the top bay assembly 317. As illustrated in FIGS. 18-20, this position facilitates the hoisting of the turbine 15 using a rigging assembly 380 in a manner similar to that described above. Referring to FIG. 20, following hoisting of the turbine 15, the hydraulic rams 370 are extended causing the lifting apparatus to pivot such that the transverse beam 345 is raised above the top bay assembly 317 to a position where the turbine 15 can be lowered and secured to connecting hardware positioned atop the top bay assembly 317. Referring now to FIGS. 21 and 22, the blade assembly 19 is next hoisted with the lifting apparatus 320 assuming its first position 360. Following hoisting of the blade assembly 19, the hydraulic rams 370 are extended causing the lifting apparatus to pivot to a second position 363 where the blade assembly 19 can be secured to the driven shaft extending from the turbine 15. Following complete installation of the turbine 15 and blade assembly 19 and removal of the rigging apparatus 380, the lifting apparatus 320 is removed using the same crane employed to construct the tower and hoist and install the lifting apparatus 320 on the top bay assembly 317.

While the foregoing described embodiment considers a pair of hydraulic rams connected to each telescoping member, those having skill in the art should appreciate that fewer or additional hydraulic rams may be used depending on the loads developed in the hoisting and pivoting process. Furthermore, those having skill in the art should also appreciate that the telescoping members themselves might comprise a hydraulic ram, to the exclusion of or in addition to, the hydraulic pairs of rams described above and illustrated in the drawings.

Referring now to FIGS. 23-26, a further embodiment of a lifting apparatus 420 connected to and operational with a top bay assembly 417 of a space frame tower is disclosed. The lifting apparatus 420 comprises first 430 and second 431 lifting truss and hydraulic ram assemblies. Each truss and ram assembly generally comprises a lifting truss 432 and a hydraulic ram 433. First 434 and second 435 supporting frame members are connected to and disposed on the sides of the top bay assembly 417. More specifically, the lifting truss 432 of the first assembly 430 comprises a first member 436 having a first end 437 pivotally connected to a fore portion 438 of the first supporting frame member 434 and a second end 439 pivotally connected to a first end 440 of a transverse beam 445. The lifting truss 432 further comprises a second member 446 and a third member 447. The second member 446 has a first end 448 connected to the second end 439 of the first member and a second end 449. The third member 447 has a first end 450 connected to the first end 437 of the first member 436 and a second end 451 connected to the second end 449 of the second member 446 at a connecting joint 452. The second ends 449, 451 of the second 446 and third 447 members are spaced a distance from an intermediate portion of the first member 436, and the connecting joint 452 of the second ends 449, 451 of the second 446 and third 447 members and the intermediate portion 453 of the first member 446 are connected by an internal truss element 454. The hydraulic ram 433 includes a cylinder unit 471 and a piston unit 472. The cylinder unit 471 includes an end 473 that is pivotally connected to an aft portion 455 of the first 434 supporting frame member, while the piston unit 472 has an end that is pivotally connected to the lifting truss 432 proximate the connecting joint 452 of the second ends 449, 451 of the second 446 and third 447 members. The second truss and ram assembly 431 comprises a lifting truss and hydraulic ram similar to that described above with respect to the first truss and ram assembly 430. The lifting truss is pivotally connected at one end 460 to the second supporting frame member 435, while pivotally connected at the other end 461 to a second end 443 of the transverse beam 445.

Figure 26:
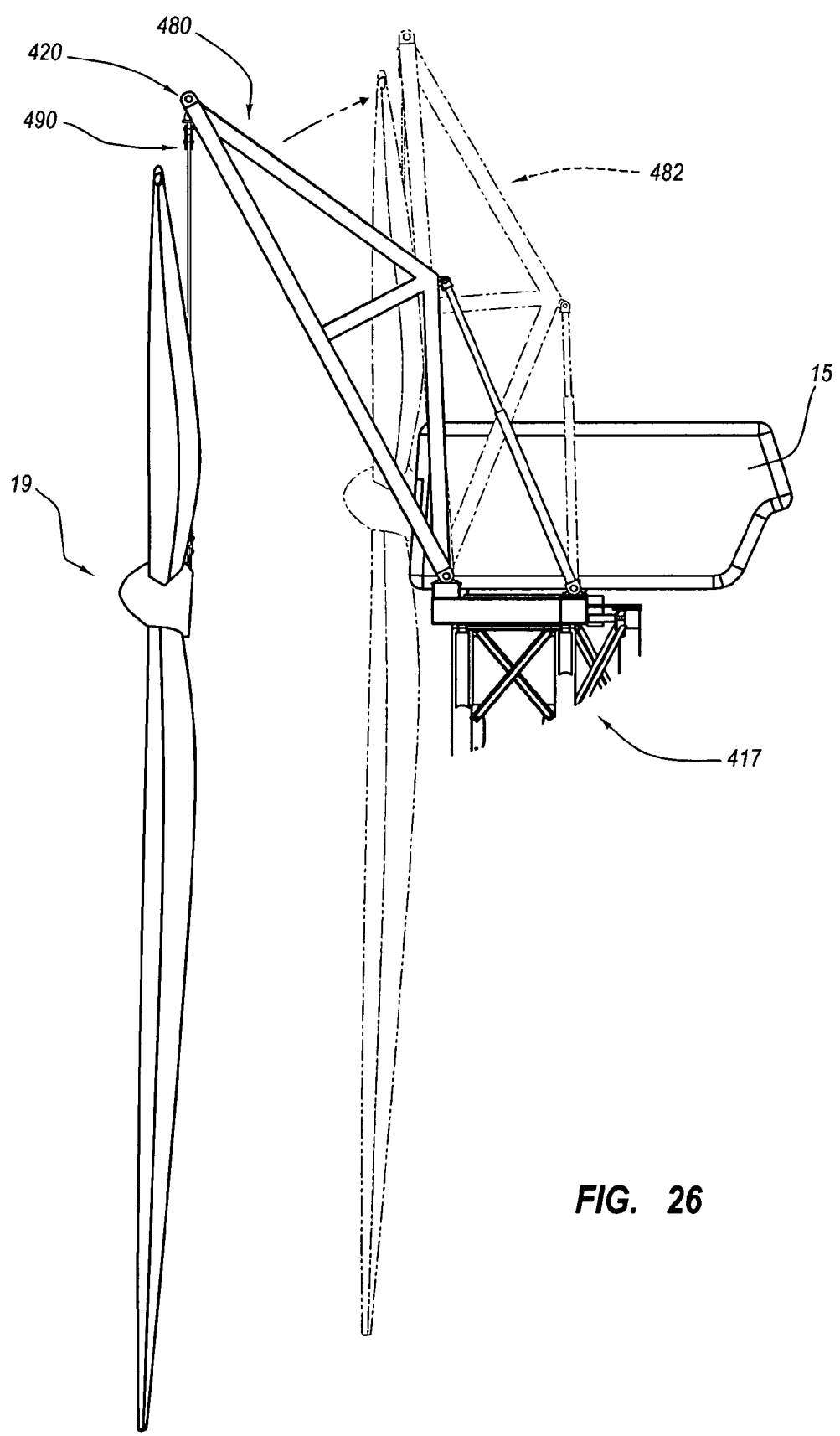
FIG. 26 illustrates the embodiment of the present invention depicted in FIG. 17 pivoting to bring the blade assembly into position for attachment to the structural tower.

As illustrated in FIG. 26, when constructed in the fashion above described, the transverse beam 445 of the lifting frame 420 is pivotable between a first position 480 extending fore of the top bay assembly 417 and a second position 482 extending substantially vertically above the top bay assembly 417. Referring now to FIGS. 23-26, control of the pivoting movement arises through the hydraulic rams 433. When the hydraulic rams 433 are in an extended position, the lifting device 420 assumes a position 480 with the transverse beam 445 extending fore of the top bay assembly 417. As illustrated, this position facilitates the hoisting of the turbine 15 using a rigging assembly 490 in a manner similar to that described above. Following hoisting of the turbine 15, the hydraulic rams 433 are retracted causing the lifting apparatus 420 to pivot such that the transverse beam 445 is raised above the top bay assembly 417 to a position where the turbine 15 can be lowered and secured to connecting hardware positioned atop the top bay assembly 417. The blade assembly 19 is next hoisted with the lifting apparatus 420 assuming its fore extending position. Following hoisting of the blade assembly 19, the hydraulic rams 433 are retracted causing the lifting apparatus 420 to pivot to a second position 482 where the blade assembly 19 can be secured to the driven shaft extending from the turbine 15. Following complete installation of the turbine 15 and blade assembly 19 and removal of the rigging apparatus 490, the lifting apparatus 420 is removed using the same crane employed to construct the tower and hoist and install the lifting apparatus 420 on the top bay assembly 417.

While the foregoing described embodiment considers a single hydraulic ram connected to each lifting truss, those having skill in the art should appreciate that additional hydraulic rams may be used depending on the loads developed in the hoisting and pivoting process. Furthermore, those having skill in the art should also appreciate that the shape and construction of the lifting truss is exemplary and can reasonably assume other shapes and constructions, such as those discussed above with regard to other embodiments of lifting frames.

Certain embodiments and details have been included herein and in the attached invention disclosure for purposes of illustrating the invention. Nevertheless, it will be apparent to those skilled in the art that various changes in the methods and apparatuses disclosed herein may be made without departing form the scope of the invention, which is defined in the appended claims.

What is claimed is:

1. An apparatus for lifting a wind turbine assembly to the top of a high-elevation structural tower, comprising:
    a support frame connected to the tower approximate the uppermost portion of the tower;
    wherein the tower is a space frame tower having a plurality of legs interconnected by support
    members;
    wherein said support frame is configured to be removably attached to at least two legs of the space frame tower in order to dissipate loading among a plurality of legs;
    a first lifting truss pivotally connected to the support frame wherein said support frame is configured to be placed at a single location on the tower during its use;
    the first lifting truss having a distal end extending away from the support frame;
    a rigging assembly connected proximate the distal end and configured for hoisting a turbine
    to the upper end of the tower; and
    an hydraulic ram having a first end connected to the support frame and a second end connected to the first lifting truss.

2. The apparatus of claim 1, further comprising a second lifting truss pivotally connected to the support frame, the second lifting truss having a distal end extending away from the support frame; and a transverse beam extending between the distal ends of the first and second lifting trusses.

3. The apparatus of claim 2, wherein the rigging assembly is connected to the transverse beam.

4. The apparatus of claim 2, further comprising an hydraulic ram having a first end connected to the support frame and a second end connected to the second lifting truss.

5. The apparatus of claim 1, wherein the first lifting truss consists of a single member.

6. The apparatus of claim 1, wherein the first lifting truss comprises a plurality of members interconnected to form a triangular truss.

7. The apparatus of claim 2 wherein the first lifting truss consists of a single member and the second lifting truss consists of a single member.

8. The apparatus of claim 2, wherein the first lifting truss comprises a plurality of members interconnected to form a triangular truss and the second lifting truss comprises a plurality of members interconnected to form a triangular truss.

9. The apparatus of claim 8 wherein the first lifting truss has a geometric construction substantially identical to the second lifting truss.

10. A method for erecting a high-elevation multiple-bay structural tower and associated wind turbine equipment on a foundation, the method comprising the steps of:
    securing a base bay assembly to the foundation;
    positioning an intermediate bay assembly on top of the base bay assembly using a crane;
    positioning a top bay assembly on top of the first intermediate bay assembly using a crane;
    positioning an apparatus for lifting a wind turbine proximate the top bay assembly using a crane; and
    positioning a wind turbine on top of the top bay assembly using the apparatus for lifting a wind turbine,
    wherein the apparatus for lifting a wind turbine includes:
    a support frame connected to the top bay assembly of the tower;
    wherein the tower is a space frame tower having a plurality of legs interconnected by support members;
    wherein said support frame is configured to be removably attached to at least two legs of the space frame tower in order to dissipate loading among a plurality of legs;
    a first lifting truss pivotally connected to the support frame, wherein said support frame is configured to be placed at a single location on the tower during its use;
    the first lifting truss having a distal end extending away from the support frame;
    a rigging assembly connected proximate the distal end and configured for hoisting a turbine to the upper end of the tower; and
    an hydraulic ram having a first end connected to the support frame and a second end connected to the first lifting truss.

* * * * *